US012786587B2

(12) United States Patent
Kodukula et al.

(10) Patent No.: US 12,786,587 B2
(45) Date of Patent: Nov. 3, 2026

(54) SYSTEMS AND METHODS FOR DYNAMIC VOLTAGE SCALING OF IMAGE SENSORS TOWARDS LOW-POWER IOT VISION

(71) Applicants: Venkatesh Kodukula, Tempe, AZ (US); Mason Manetta, Mesa, AZ (US); Robert LiKamWa, Tempe, AZ (US)

(72) Inventors: Venkatesh Kodukula, Tempe, AZ (US); Mason Manetta, Mesa, AZ (US); Robert LiKamWa, Tempe, AZ (US)

(73) Assignee: Arizona Board of Regents on Behalf of Arizona State Univeristy, Tempe, AZ (US)

( * ) Notice: Subject to any disclaimer, the term of this patent is extended or adjusted under 35 U.S.C. 154(b) by 74 days.

(21) Appl. No.: 18/807,859

(22) Filed: Aug. 16, 2024

(65) Prior Publication Data

US 2025/0063268 A1 Feb. 20, 2025

Related U.S. Application Data

(60) Provisional application No. 63/533,521, filed on Aug. 18, 2023.

(51) Int. Cl.
*H04N 25/709* (2023.01)
*H04N 23/60* (2023.01)
*H04N 25/60* (2023.01)

(52) U.S. Cl.
CPC ......... *H04N 25/709* (2023.01); *H04N 23/665* (2023.01); *H04N 25/60* (2023.01)

(58) Field of Classification Search
CPC .... H04N 23/65; H04N 23/651; H04N 23/665; H04N 25/60; H04N 25/709
See application file for complete search history.

(56) References Cited

U.S. PATENT DOCUMENTS

2016/0037110 A1* 2/2016 Choi .................... H04N 25/709 348/294

OTHER PUBLICATIONS

A Framework for Dynamic Voltage Scaling of Image Sensors Towards Low Power IoT Vision to Kodukula et al Published Oct. 2, 2023 (Year: 2023).*
Kodukula, V. et al., "Squint: A Framework for Dynamic Voltage Scaling of Image Sensors Towards Low Power loT Vision," In The 29th Annual InternationalConference on Mobile Computing and Networking (ACM MobiCom'23), Oct. 2-6, 2023, p. 1345-1359.
Wikipedia, "Amazon Go," https://en.wikipedia.org/wiki/Amazon_Go, 7 pages.
Wikipedia, "Microsoft HoloLens," https://en.wikipedia.org/wiki/Microsoft_HoloLens, 12 pages.
Naderiparizi, S. et al., "Wispcam: A Battery-Free RFID Camera," In IEEE Intl. Conf on Rfid (Rfid), Apr. 15-17, 2015, p. 166-173.
(Continued)

*Primary Examiner* — Daniel M Pasiewicz
(74) *Attorney, Agent, or Firm* — Polsinelli PC

(57) ABSTRACT

A system for implementation within a visual sensing pipeline facilitates dynamic voltage scaling for image sensors, enabling image sensors to capture frames at varying fidelities for improved energy efficiency. The system includes hardware and software interfaces to enable dynamic voltage scaling, and are demonstrated with integration into an RPi-based streaming platform. The system is evaluated with representative IoT/AR workloads over various voltage scheduling policies.

20 Claims, 19 Drawing Sheets

(a) Calibration

(56) References Cited

OTHER PUBLICATIONS

Naderiparizi, S. et al., "Towards Battery-Free HD Video Streaming," In 15th USENIX Symposium on Networked Systems Design and Implementation (NSDI), Apr. 9-11, 2018, pp. 233-247.
Josephson, C. et al., "Wireless Computer Vision Using Commodity Radios," In Proc of the 18th International Conference on Information Processing in Sensor Networks (IPSN), Apr. 16-18, 2019, p. 229-240.
Naderiparizi, S. et al., "Glimpse: A programmable Early-Discard Camera Architecture for Continuous Mobile Vision," In Proceedings of the 15th Annual International Conference on Mobile Systems, Applications, and Services (MobiSys), Jun. 16, 2017, p. 292-305.
Nardello, M. et al., "Camaroptera: A batteryless long-range remote visual sensing system," In Proceedings of the 7th International Workshop on Energy Harvesting & Energy-Neutral Sensing Systems, Nov. 10, 2019, p. 8-14.
Choi, J. et al., "Always-On CMOS Image Sensor for Mobile and Wearable Devices," IEEE Journal of Solid-State Circuits, vol. 51, No. 1, Jan. 2016, pp. 130-140.
Murakami, H. et al., "A 4.9Mpixel Programmable-Resolution Multi-Purpose CMOS Image Sensor for Computer Vision," IEEE International Sold-State Circuits Conference (ISSCC), Feb. 21, 2022, 3 pages.
Delbracio, M. et al., "Mobile Computational Photography: A Tour," Annual Review of Vision Science, Mar. 10, 2021, pp. 571-604.
Bick, C. et al., "Millimeter-sized smart sensors reveal that a solar refuge protects tree snail partula hyalina from extirpation," Nature's Communications Biology, 2021, 8 pages.
Iyer, V. et al., "Wireless steerable vision for live insects and insect-scale robots," Science Robotics, Jul. 15, 2020, 13 pages.
Tom's Guide, "Magic Leap 2 release date, price and all the new features," https://www.tomsguide.com/news/magic-leap-2-everything-weve-heard-so-far, Mar. 11, 2022, 19 pages.
Image Sensors World, "Era of 2.2V Supply Coming," https://image sensors world.blogspot.com/2021/09/era-of-22v-supply-coming.html., Sep. 3, 2021, 8 pages.
Image Sensors World, "Samsung Announces 200MP 0.64um Pixel Mobile Sensor," https://image sensors-world. blogspot.com/2021/09/samsung-announces-200mp-064um-pixel.html., Sep. 2, 2021, 8 pages.
Image Sensors World, "Samsung Announces 50MP 1um Pixel Sensor with All-Direction PDAF," https://image-sensors-world.blogspot.com/2021/09/samsung-announces-50mp-1um-pixel-sensor.html., Sep. 2, 2021, 8 pages.
Hu, J. et al., "Banner: An Image Sensor Reconfiguration Framework for Seamless Resolution-based Tradeoffs," In Proc of the 17th Annual Int Conf on Mobile Systems, Applications, and Services, Jun. 17-21, 2019, p. 236-248.
Likamwa, R. et al., "Energy Characterization and Optimization of Image Sensing Toward Continuous Mobile Vision," In Proc of the 11th annual international conf on Mobile systems, applications, and services, Jun. 25, 2013, p. 69-81.
Kitamura, K. et al., "A 33-megapixel 120-Frames-Per-Second 2.5-Watt CMOS Image Sensor With col. Parallel Two-Stage Cyclic Analog-to-Digital Converters," IEEE Transactions on Electron Devices, Dec 12, 2012, p. 3426-3433.
Choi, J. et al., "An Energy/Illumination-Adaptive CMIS Image Sensor With Reconfigurable Modes of Operations," IEEE Journal of Solid-State Circuits, vol. 50, No. 6, Jun. 2015, p. 1438-1450.
Takayanagi, I. et al., "A 1.25-inch 60-frames/s 8.3-M-Pixel Digital-Output CMOS Image Sensor," IEEE Journal of Solid-State Circuits, vol. 40, No. 11, Nov. 2005, p. 2305-2314.
Chin, L. et al., " A Four Transistor CMOS Active Pixel Sensor with High Dynamic Range Operation," In Proceedings of Asia-Pacific Conference on Advanced System Integrated Circuits. IEEE, Aug. 4-5, 2004, p. 124-127.
Fossum, E. R. et al., "A Review of the Pinned Photodiode for CCD and CMOS Image Sensors," IEEE Journal of the Electron Devices Society, May 2014, p. 33-43.
Kodukula, V. et al., "Dynamic Temperature Management of Near-Sensor Processing for Energy-Efficient High- Fidelity Imaging," Sensors 2021, Jan. 30, 2021, p. 1-20.
Omnivision OV5647 Datasheet, Preliminary Specification, https://www.uctronics.com/download/Image_Sensor/OV5647_DS.pdf., Nov. 2009, 140 pages.
Onsemi, "Python 1.3/0.5/0.3 MegaPixels Global Shutter CMOS Image Sensors," https://www.onsemi.com/pdf/datasheet/noip1sn1300a-d.pdf, Aug. 2021, 77 pages.
Theuwissen, A., "How To Measure Temporal Noise in Dark?," https://harvestimaging.com/blog/?p=994, Jun. 12-13, 2012, 3 pages.
Theuwissen, A., "How to measure the average dark signal?," https://harvestimaging.com/blog/?p=795, Aug. 25, 2011, 3 pages.
Ebner, M., "Combining White-Patch Retinex and the Gray World Assumption to Achieve Color Constancy for Multiple Illuminants," In Joint Pattern Recognition Symposium, Sep. 10, 2003, p. 60-67.
Cheng, D. et al., "Illuminant estimation for color constancy: why spatial-domain methods work and the role of the color distribution," JOSA Am. A, May 2014, p. 1049-1058.
Van Der Weijer, J. et al., "Edge-Based Color Constancy," IEEE Transactions on Image Processing, vol. 16, No. 9, Sep. 9, 2007, p. 2207-2214.
Ziyadinov, V. et al., "Noise Immunity and Robustness Study of Image Recognition Using a Convolutional Neural Network," Sensors, Feb. 6, 2022, 16 pages.
Sony, IMX219PQH5-C Datasheet, "Diagonal 4.60 mm (Type 1/4.0) 8 Mega-Pixel CMOS Image Sensor with Square Pixel for Color Cameras," https://github.com/rellimmot/Sony-IMX219-Raspberry-Pi-V2-CMOS/blob/master/RASPBERRY%20PI%20CAMERA%20V2%20DATASHEET%20IMX219PQH5_7.0.0_ Datasheet_XXX.PDF.
Microchip MCP4725, "12-Bit Digital-to-Analog Converter with EEP-ROM Memory in SOT-23-6," https://ww1.microchip.com/downloads/aemDocuments/documents/OTH/ProductDocuments/DataSheets/22039d.pdf . . . 2009, 50 pages.
Texas Instruments, "OPA55x High-Voltage, High-Current Operational Amplifiers," https://www.ti.com/lit/gpn/OPA551., Jan. 2016, 35 pages.
Wikipedia, Representational state transfer,. https://en.wikipedia.org/wiki/Representational_state_transfer, 5 pages.
Fielding, R. T., Architectural styles and the design of network-based software architectures. University of California, Irvine, 2000, 183 pages.
Dehmelt, F. "Adaptive (dynamic) Voltage (Frequency) Scaling-Motivation and Implementation," Texas Instruments, Application Report, Mar. 2014, p. 1-10.
Elgebaly, M. et al., "Variation-Aware Adaptive Voltage Scaling System," IEEE Transactions on Very Large Scale Integration (VLSI) Systems, vol. 15, No. 5, May 2007, pp. 560-571.
Arm, Arm Cortex-M4 Datasheet, https://www.arm.com/-/media/Arm%20Developer%20Community/PDF/Processor%20Datasheets/Arm%20Cortex-M4%20Processor%20Datashe et.pdf.
Kodukula, V. et al., "Rhythmic pixel regions: Multi-resolution Visual Sensing System towards High-Precision Visual Computing at Low Power," In Proceedings of the 26th ACM International Conference on Architectural Support for Programming Languages and Operating Systems, Apr. 19-23, 2021, p. 573-586.
Chandrakasan, A. P. et al., "Low-power CMOS Digital Design," IEEE Journal of Solid-State Circuits, vol. 27, No. 4, Apr. 1992, p. 473-484.
Nakai, M. et al., "Dynamic Voltage and Frequency Management for a Low-Power Embedded Microprocessor," IEEE Journal of Solid-State Circuits, vol. 40, No. 1, Jan. 2005, p. 28.35.
Osawa, M. et al., "An Adaptive Frame Image Sensor with Fine-grained Power Management for Ultra-Low Power Internet of Things Application," In IEEE 44th European Solid State Circuits Conference (ESSCIRC), September 3-6. 2018, p. 58-61.

(56) References Cited

OTHER PUBLICATIONS

Kim, V. et al., “System Level Analysis of Fast, Per-Core DVFS Using On-Chip Switching Regulators,” In IEEE 14th International Symposium on High Performance Computer Architecture, Feb. 16-20, 2008, p. 123-134.

Weiser, M. et al., “Scheduling for Reduced CPU Energy,” USENIX 1994 Operating Systems Design and Implementation Proceedings (OSDI ’94), Nov. 14-17, 1994, p. 449-471.

Vashsht, D. et al., “FarmBeats: An IoT Platform for Data-Driven Agriculture,” 14th USENIX Symposium on Networked Systems Design and Implementation, Mar. 27-29, 2017, p. 515-529.

* cited by examiner 2.8 V 1.4 V 2.8 V 1.4 V (a) Calibration (b) Execution (a) Random (b) Lightutil (c) On-Demand (a) Random (b) Lightutil (c) On-Demand

(a) Task accuracy

(b) Power

(a) Task accuracy

(b) Power

SYSTEMS AND METHODS FOR DYNAMIC VOLTAGE SCALING OF IMAGE SENSORS TOWARDS LOW-POWER IOT VISION

CROSS-REFERENCE TO RELATED APPLICATIONS

This is a U.S. Non-Provisional patent application that claims benefit to U.S. Provisional Patent application Ser. No. 63/533,521 filed Aug. 18, 2023, which is herein incorporated by reference in its entirety.

GOVERNMENT SUPPORT

This invention was made with government support under 1909663 awarded by the National Science Foundation. The government has certain rights in the invention.

FIELD

The present disclosure generally relates to visual sensing, and in particular, to a system and associated method for dynamically adapting sensor voltage for visual sensing on a frame-by-frame basis.

BACKGROUND

Energy-efficient visual sensing is of paramount importance to enable battery-backed low power IoT and mobile applications. Unfortunately, modern image sensors still consume hundreds of milliwatts of power, mainly due to analog readout. This is because current systems usually supply a fixed voltage to the sensor's analog circuitry leading to higher power profiles.

It is with these observations in mind, among others, that various aspects of the present disclosure were conceived and developed.

BRIEF DESCRIPTION OF THE DRAWINGS

FIG. 5A shows a first image captured with an analog supply voltage of 2.8V, FIG. 5B shows a second image captured with an analog supply voltage of 1.4V, and FIG. 5C shows histograms associated with the captured images of FIGS. 5A and 5B;

FIG. 12A shows the system and FIG. 12B shows the voltage controller of the system;

Corresponding reference characters indicate corresponding elements among the view of the drawings. The headings used in the figures do not limit the scope of the claims.

DETAILED DESCRIPTION

A system and associated methods outlined herein enable aggressive scaling of analog voltage supplied to an image sensor (e.g., a camera) as a means to significantly reduce sensor power consumption. The system implements a visual streaming pipeline (also referred to herein as "Squint") that flexibly allows application developers to dynamically adapt sensor voltage on a frame-by-frame basis. The system includes a voltage controller that programmatically generates desired sensor voltage based on application request. The present disclosure demonstrates integration of the voltage controller of the system into an existing RPi-based video streaming IoT pipeline with runtime support for flexible voltage specification from vision applications.

The present disclosure provides a characterization of power and fidelity implications of analog voltage scaling on three off-the-shelf sensors for development of the system. The characterization reveals that analog voltage scaling reduces sensor power but also degrades image quality. Furthermore, the degradation in image quality situationally affects the task accuracy of vision applications. These observations were used to develop and implement the system outlined herein. The present disclosure further demonstrates an evaluation of the system over a wide range of voltage scaling policies on popular vision tasks, revealing that the system can deliver up to 73% sensor power savings, while maintaining reasonable task fidelity.

1. Introduction

Visual computing systems sense and perceive the world using cameras enabling a variety of IoT and mobile applications. IoT systems use cameras to perform tasks such as predicting irrigation patterns in Al-enabled farms, detecting wildfires in forests, and monitoring animal movements in wildlife sanctuaries. Energy-efficient sensing is of utmost importance for such IoT systems as they are deployed in the wild and typically operate on miniscule batteries. Energy-efficient sensing is also important for multi-camera mobile systems, such as augmented reality headsets, wherein several cameras, e.g., 18 cameras on Magic Leap v2 headset, perform tasks such as world tracking, eye tracking, and body tracking, quickly draining the system's battery.

Figure 1A:
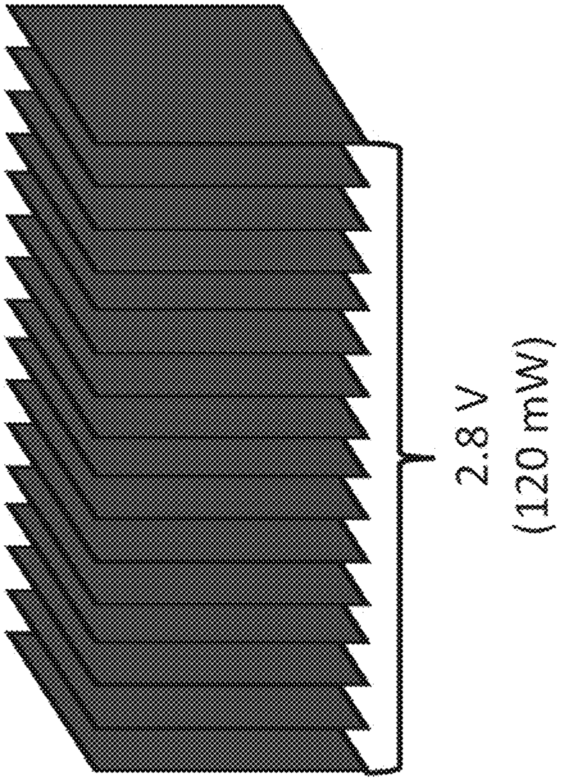
FIGS. 1A and 1B are a pair of graphical representations showing supplied voltage per frame to an image sensor for existing systems (FIG. 1A) and a system described herein (FIG. 1B)
Figure 1B:
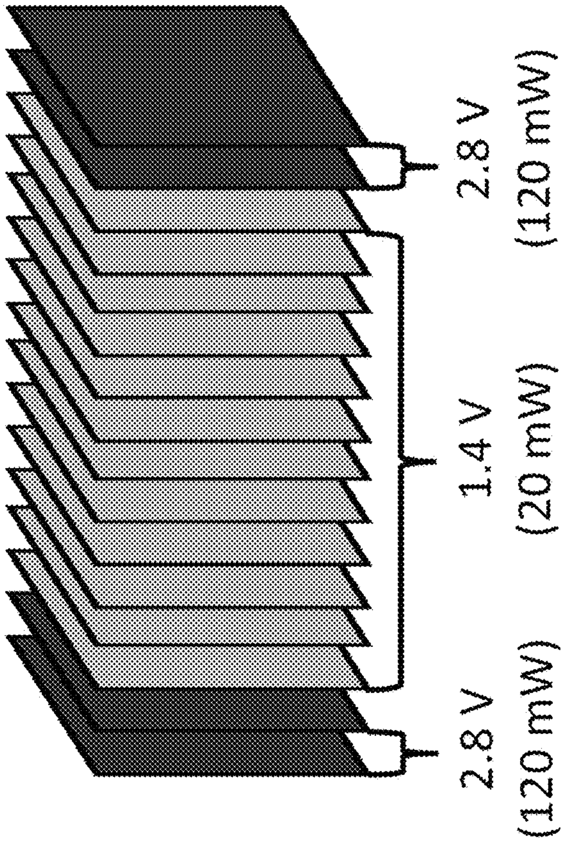

Unfortunately, modern image sensors are limited in their energy-efficiency due to analog readout and consume hundreds of milliwatts of power while performing continuous visual tasks. This is because existing systems (FIG. 1A) always supply a fixed voltage to the sensor's analog circuitry regardless of the frame. This work aims to improve the capabilities of visual computing systems by allowing them to dynamically vary the analog voltage supplied to the sensor on a frame-by-frame basis (FIG. 1B) for significant efficiency gains.

While dynamic voltage scaling of image sensors leads to large power savings, it also degrades the sensor's imaging fidelity due to reduced analog-to-digital converter (ADC) output swing and increased pixel noise (§ 2). To assess fidelity issues, the present disclosure outlines a characterization of energy and fidelity implications of analog voltage scaling of three popular off-the-shelf cameras. In addition to confirming the large sensor power savings created by aggressive voltage scaling, the characterization reveals a useful insight: degradation in imaging fidelity due to aggressive voltage scaling does not significantly affect the task accuracy of modern neural network-based vision workloads in most situations. That said, it is also found that high fidelity is still sporadically needed to precisely detect scene features for tracking tasks, especially under challenging situations such as low-light and crowded scenes.

The idea to dynamically scale a component's voltage for reduced energy usage is inspired by dynamic voltage scaling (DVS) for CPUs, a power savings technique. However, unlike DVS for CPUs, analog voltage scaling when applied to vision sensing introduces unique noise considerations due to direct reliance on fidelity of analog circuitry for image readout. Sensor manufacturers have been moving towards designing sensors with lower pixel supply voltage. However, these sensors need explicit design changes to overcome the fidelity issues caused due to lower pixel voltage.

To design the system support (§ 3) to allow sensor dynamic voltage scaling, the present disclosure introduces a voltage controller hardware interface of the system that can programmatically generate desired sensor voltage requested by applications. Further, the present disclosure introduces "Squint" runtime that includes a software API, allowing application developers to seamlessly specify voltage schedules directly from the vision applications on a frame-by-frame basis. These interfaces integrate well with existing and future visual computing systems, allowing for an easier upgrade.

To evaluate the system, one implementation (§ 4) of the system is designed for implementation within a Raspberry Pi (RPi)-based streaming pipeline for visual sensing. Various visual workloads can be supported by the system, including neural network-based people detection and OpenCV-based camera pose estimation. Through evaluation (§ 5) across a range of voltage scheduling policies, the present disclosure demonstrates the opportunity of "Squint"-based imaging (e.g., by the system outlined herein) to decrease sensor power consumption by up to 73%, with minimal degradation in visual task accuracy. Through reduction in sensor power, Squint-based imaging techniques can significantly extend the battery life of IoT and mobile systems.

In summary, the present disclosure outlines the following contributions:

- Exploitation of dynamic voltage scaling for image sensors, where different frames are captured at different fidelities for overall system energy-efficiency, while respecting task needs.
- Characterization of the energy and fidelity implications of analog voltage scaling on off-the-shelf commercial image sensors.
- A lightweight and fully programmable voltage controller for generating a desired analog supply voltage for the camera, along with a library and runtime support to coordinate vision applications with voltage controller operation.
- Augmentation of hardware and software support to integrate the system with an existing commercial IoT streaming pipeline built around an RPi platform.
- Evaluation of the augmented system on a variety of vision tasks to demonstrate significant reduction in sensor power with controllable accuracy loss.

2. Background and Motivation 2.1 Analog Readout is the Bottleneck for Sensor Energy-Efficiency Modern IoT and mobile systems employ CMOS image sensors for video analytics and photography. CMOS image sensors are more efficient than their CCD counterparts, but still consume hundreds of milliwatts, due to their power-hungry analog readout.

Modern image sensors include three major elements: pixel array, analog readout, and digital logic. The pixel array converts light into voltages, consuming little energy. Analog readout amplifies analog signals from the pixel array and converts them into digital values. Finally, digital logic maintains sensor operation, including timing generation and preparing data to send to the outside world.

Notably, the analog readout consumes 50%-75% of overall energy in recent sensor designs. This is due to two factors:

(i) Analog circuits need to operate all the time, making them power hungry compared to their digital counterparts which operate only on the active clock edge.

(ii) Technology scaling improvements for energy efficiency have been much slower for analog components compared to digital.

2.2 Effects of Analog Voltage Variations on Image Sensor Circuitry

Figure 2B:
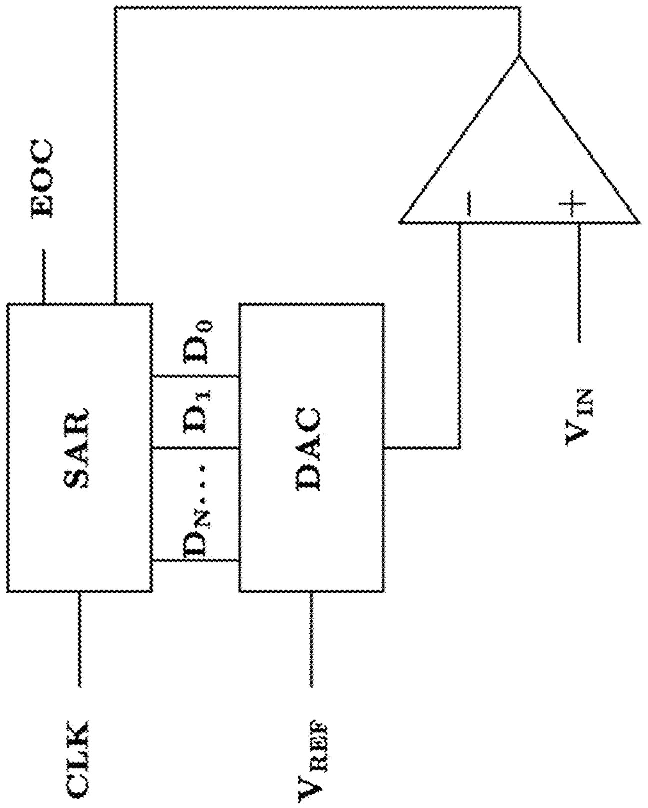
FIGS. 2A and 2B are a pair of schematic diagrams showing design of a pixel (FIG. 2A) and an analog-to-digital converter (ADC, FIG. 2B) of an image sensor for use with the system described herein, including supply voltages.
Figure 2A:
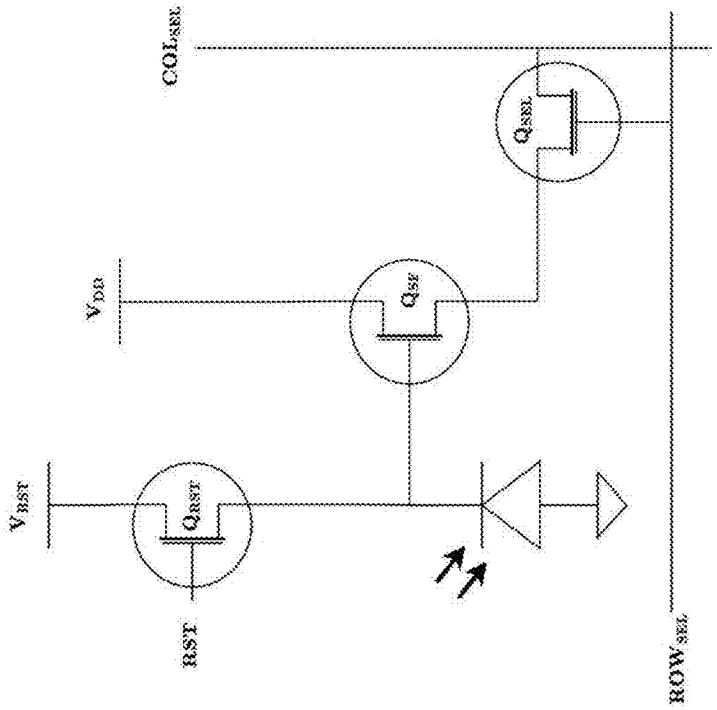

FIGS. 2A and 2B show how analog voltage variation affects pixel (FIG. 2A) and ADC (FIG. 2B) circuits. A lower voltage (VDD) for pixels would affect transistor settling times, resulting in noise. A lower reference voltage (VREF) for ADC would decrease the dynamic range, resulting in reduced contrast.

Existing systems supply higher analog voltage, typically 2.8 V, to visual sensors for high fidelity imaging. Higher analog voltage (VDD) is needed to maintain sufficient drive strength of the photo-diode, source follower, and bitline components in the pixel design, shown in FIG. 2A, for smoother charge transfer. Lowering analog voltage would weaken the drive strength of those components affecting transistor settling times, resulting in image noise. Lowering analog voltage would also slow down the charge transfer process. This would not significantly affect the imaging process if the photodiode accumulates enough charge, e.g., well-lit scenes. However, this would make the images dimmer in low-lit scenes where photodiodes do not accumulate enough charge.

Higher analog voltage (VREF) is also needed for high fidelity ADC operation for maintaining high dynamic range. Image sensors typically have a successive-approximation (SAR) ADC (FIG. 2B) that performs a binary search for generating digital output by successively comparing input voltage (VIN) against reference voltage (VREF). A higher VREF would enable higher precision output supporting a wider range of pixel intensity values leading to high dynamic range images. A lower VREF, on the other hand, would decrease the dynamic range forcing the pixels to saturate early and decreasing the overall image contrast.

While the exact pixel and ADC designs might vary for different image sensors, the fundamental underlying phenomenon of how the circuits behave at different analog voltage levels would remain the same. Furthermore, the underlying phenomena is agnostic to the shutter type, rolling or global, of the image sensor as the shutter type does not affect the charge transfer process and ADC operating mechanism.

2.3 Analog Voltage Scaling for Energy-Efficiency

To address the energy-efficiency bottleneck in visual sensing, the present disclosure is directed at scaling analog voltage to promote camera energy efficiency. Energy and fidelity implications of voltage scaling are studied by characterizing three different image sensors from three popular manufacturers, as shown in Table 1. These image sensors vary in terms of resolution, shutter type, and pixel designs, and are representative of cameras available in typical IoT and mobile systems. In this section, the findings of RPi camera characterization are presented; while other cameras revealed similar insights.

Observations show that image sensor manufacturers usually take a conservative approach when it comes to specifying the recommended operating analog voltage for stable camera operation. They typically recommend a 10% tolerance band around nominal voltage in the datasheets. In reality, however, the characterization reveals that the analog power rail can be undervolted to a value that is far beyond the recommended limit, as shown in Table 1, without affecting basic camera functionality. For instance, the RPi's analog power rail can be aggressively undervolted by up to 50% of its nominal value with the camera still streaming pixels.

TABLE 1

Characterized image sensors. Sensors can be undervolted way beyond the voltage specification mentioned in their datasheets.

| Camera system | Sensor | Max. res | Voltage range (datasheet) | Actual lower limit |
|---|---|---|---|---|
| RPi cam | Sony IMX219 | 4K | 2.8 +/− 10% | 1.2-1.5 |
| Pixycam | OmniVision OV5647 | 1080p | 2.8 +/− 10% | 1.8 |
| Python1300 | OnSemi Python1300 | SXGA | 2.8 +/− 10% | 1.7 |

The extent to which a camera can be undervolted strongly depends on sensor design and the sensor's sensitivity to analog voltage changes. Among the three sensors examined in Table 1, the characterization reveals that the RPi camera can be undervolted by a large extent compared to others. In addition to variability across cameras from different vendors, variability is also noticed across cameras from the same vendor, as shown in Table 1. This is due to the "silicon lottery": one RPi camera can undervolt slightly better than the other and vice versa.

2.3.1 Energy Implications of Voltage Scaling.

Aggressive undervolting leads to significant energy savings, as dynamic power quadratically varies with voltage ($P \propto V^2$). Since analog circuits are slow on technology scaling, dynamic power still dominates the overall power consumption by contributing to about two thirds of total power. On the other hand, static power, which is the less dominant power source in analog electronics, is largely unaffected by voltage scaling.

Figure 3:
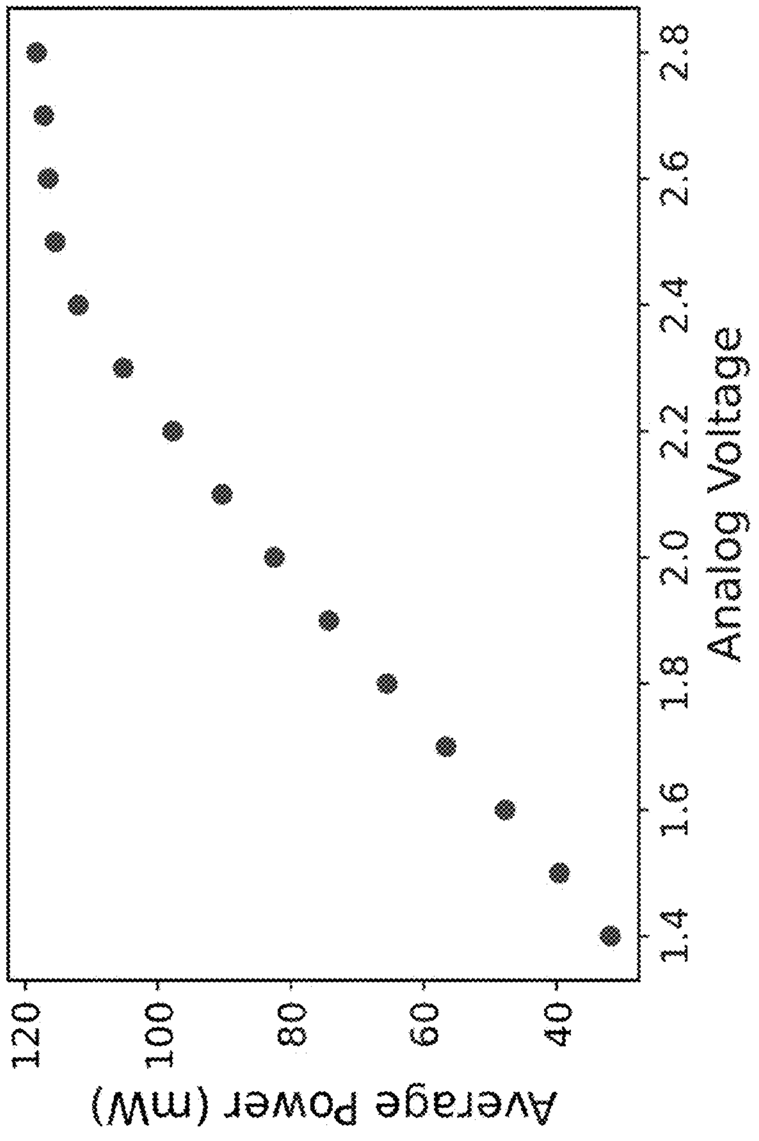
FIG. 3 is a graphical representation showing average power consumption of an image sensor across various supplied analog voltage values.

To understand how camera power varies with analog voltage scaling, the analog power rail of the RPi camera is intercepted and is instead connected to an external variable power supply. To compute overall power, the current drawn from different power rails is measured while analog voltage is varied. FIG. 3 shows that undervolting the camera voltage by 50% (i.e., from 2.8 V to 1.4 V) yields more than 50% of camera power savings. Sensor power significantly reduces by lowering its supply voltage. In FIG. 3, the flat portion above 2.4 V is due to strong voltage regulation inside the sensor.

2.3.2 Image Fidelity Implications of Voltage Scaling.

While aggressively reducing analog voltage helps significantly reduce camera power, it also impairs image quality by making images brighter and noisier. Increased brightness is due to reduction in ADC dynamic range. That is, image sensors usually have a SAR ADC and lowering the ADC's reference voltage results in lowering the output signal swing. This forces pixels to saturate early, brightening the image and decreasing the overall contrast.

Increased noise is due to more pixel shot noise triggered by reduction in pixel bias voltage as shot noise exponentially varies with the negative of bias voltage. In addition to brightness and noise artifacts, we also notice pixelation artifacts appearing in images. This is due to pixels randomly getting turned off possibly due to timing errors caused by insufficient supply voltage.

The present disclosure provides an experimental validation of these claims, developed by measuring the standard dark signal and temporal noise of the RPi camera while varying sensor analog voltage. 25 frames per voltage setting and average pixel values across frames are captured to determine the average frame. Pixel values of the average frame are averaged to compute the dark signal. For temporal noise, variance of pixel values is computed across frames to determine the variance frame. Then, all the values in the variance frame are averaged to compute the temporal noise.

Figure 4B:
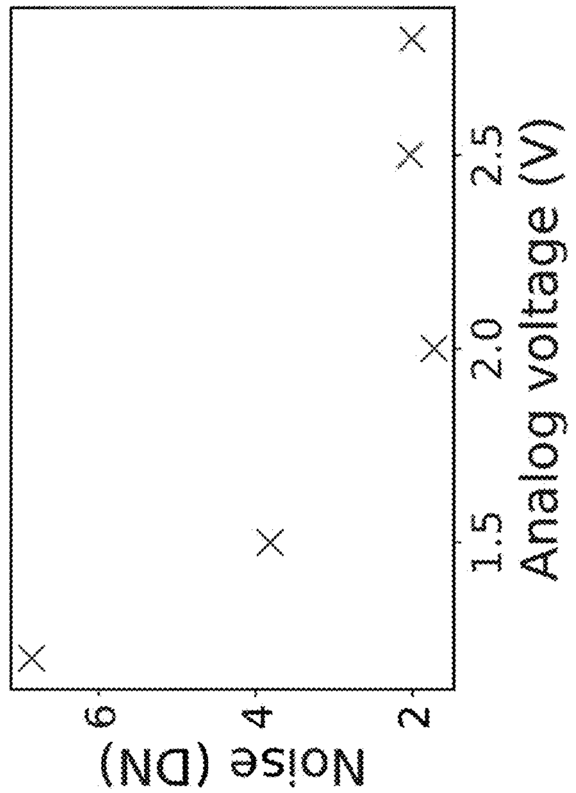
FIGS. 4A and 4B are a pair of graphical representations respectively showing sensor brightness and noise for an image sensor across various supplied analog voltage values.
Figure 4A:
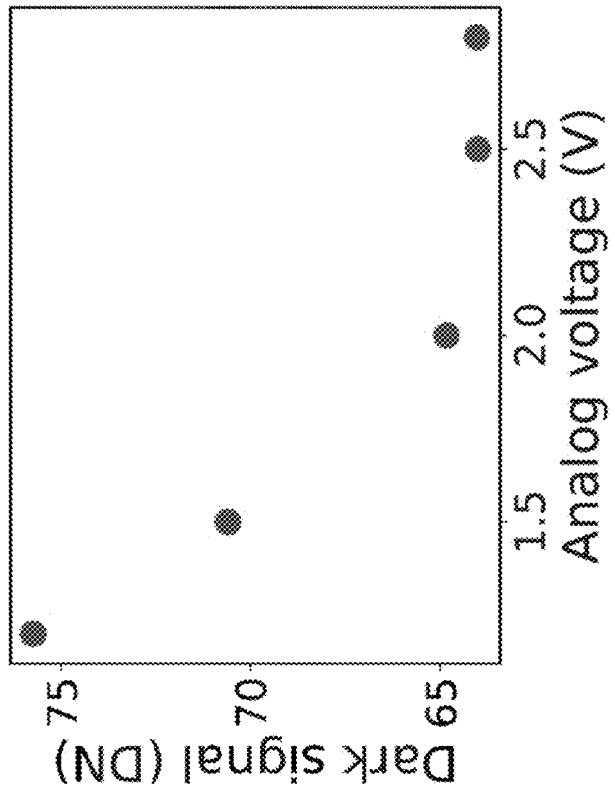
Figure 5A:
FIGS. 5A-5C are a series of images showing effects of different supplied analog voltage values of an image sensor on resulting captured images, where
Figure 5B:
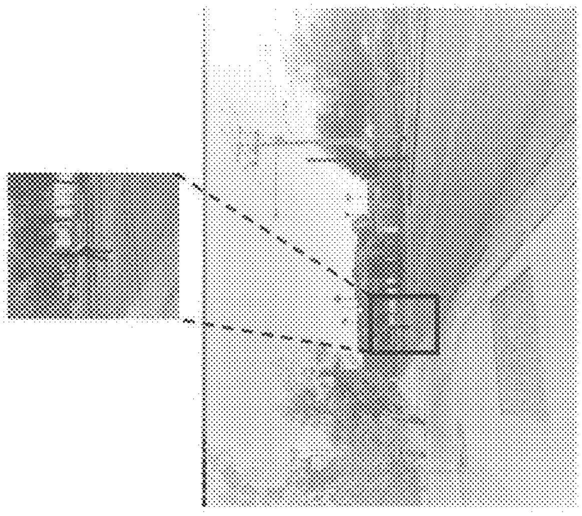
Figure 5C:
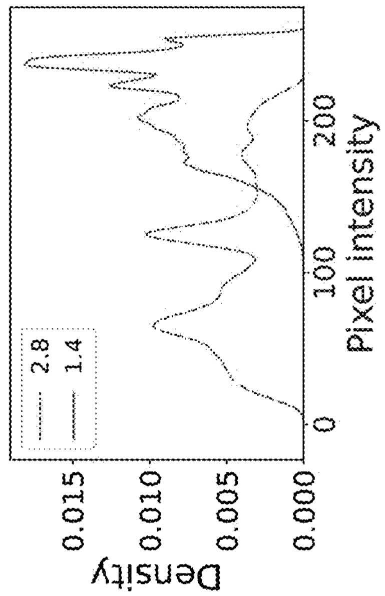

FIGS. 4A and 4B demonstrate that sensor brightness and noise levels increase with lower analog voltage. Increased brightness (FIG. 4A) is due to decreased ADC output swing and increased noise (FIG. 4B) is due to elevated shot noise levels. As shown in FIGS. 4A and 4B, the dark signal and the temporal noise substantially increase as the sensor voltage decreases. The sensor is also observed to be insensitive to voltage changes until a certain point, which could be due to strong voltage regulation inside the sensor. The brightness and noise increase is also reflected in the histograms of actual images captured by the sensor, as shown in FIGS. 5A-5C. FIGS. 5A and 5B show the images captured at different sensor voltages (2.8V and 1.4B, respectively) and their histograms are shown in FIG. 5C. The low voltage image of FIG. 5B is brighter and grainier than its high voltage counterpart shown in FIG. 5A. This is also reflected in the shift in mean and variance width in the histogram. Notice that in FIG. 5C, the peaks shift rightwards distribution spreads outwards as we switch from high voltage to low voltage.

On a side note, one can also see that the actual images in FIGS. 5A and 5B appear "greener" because they are captured RAW by turning off most image signal processing (ISP) stages. Notably, automatic white balance (AWB) is turned off to avoid color-based artifacts produced by AWB. AWB algorithms estimate color temperature of a scene based on average image intensity in order to determine appropriate gains that need to be applied for individual color channels of an image. As a result, AWB perceives brightness increase due to undervolting as change in scene brightness and apply more gain to the blue color channel, resulting in "bluish" artifacts.

2.3.3 Task Fidelity Implications of Voltage Scaling

Figure 6:
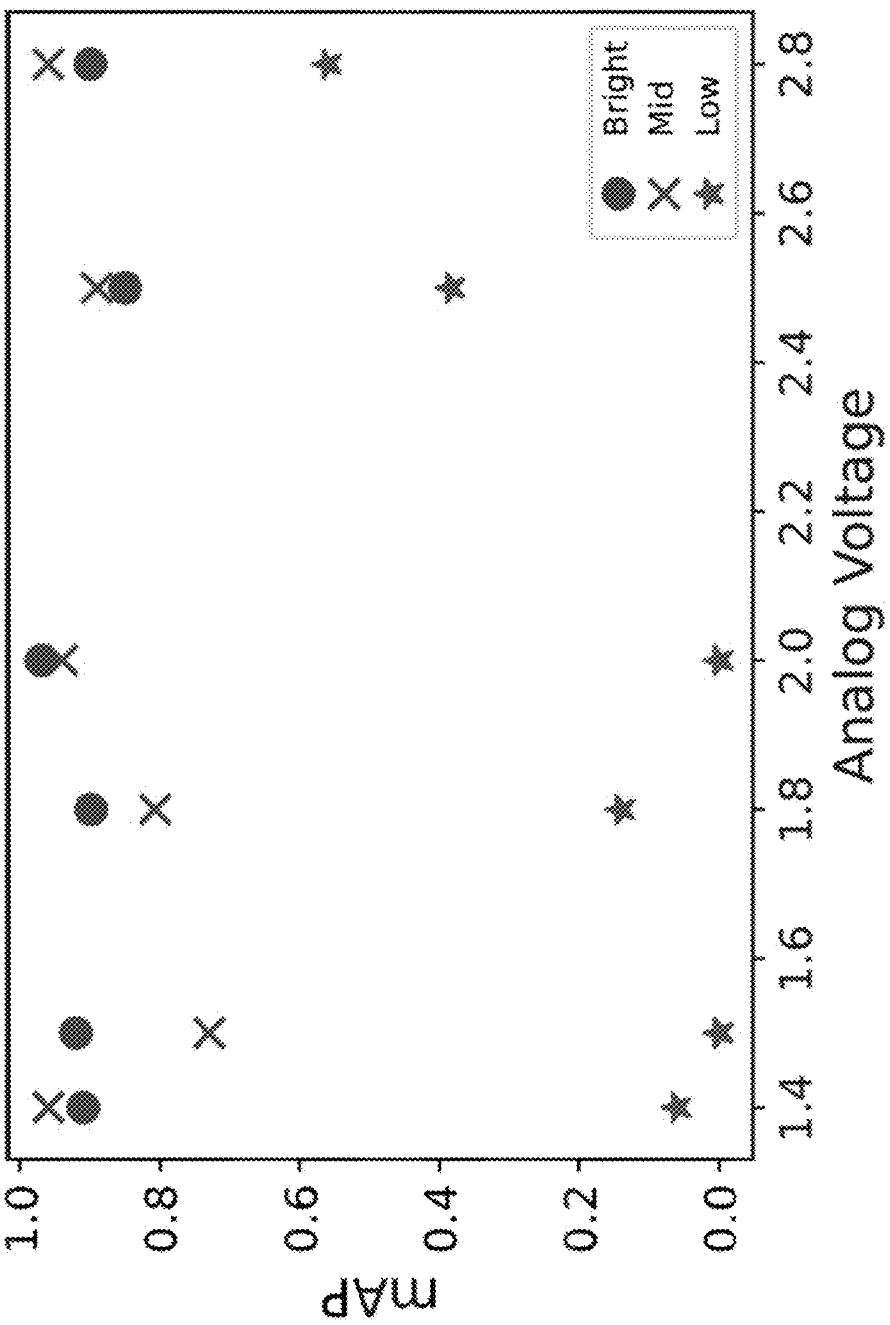
FIG. 6 is a graphical representation showing effect of brightness and noise on task fidelity of vision applications in well-lit scenes.

While aggressive undervolting impairs image fidelity by adding brightness and noise, brightness and noise increases do not appear to affect visual task fidelity in most situations. However, a noticeable degradation is observed in task fidelity under challenging scene environments, e.g., low-light scenes, as shown in FIG. 6. This creates an opportunity to situationally adapt camera voltage based on scene illumination needs. That is, the camera can be aggressively undervolted most of the time for rapid power savings, while occasionally being brought back up to nominal voltage under poor lighting conditions.

Figure 7A:
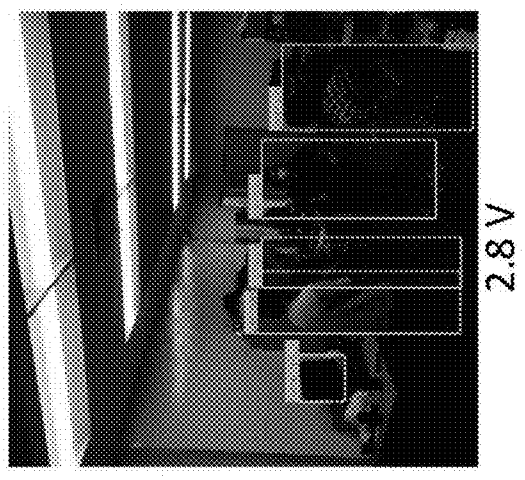
FIGS. 7A-7D are a series of images showing effects of different supplied analog voltage values of an image sensor on resulting captured images in both dimly-lit (FIGS. 7A and 7B) and well-lit (FIGS. 7C and 7D) environments, where FIGS. 7A and 7C correspond with an analog supply voltage of 2.8V, and FIGS. 7B and 7D correspond with an analog supply voltage of 1.4V.
Figure 7B:
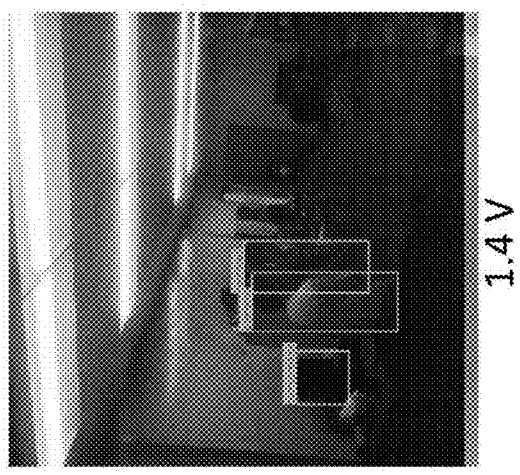
Figure 7C:
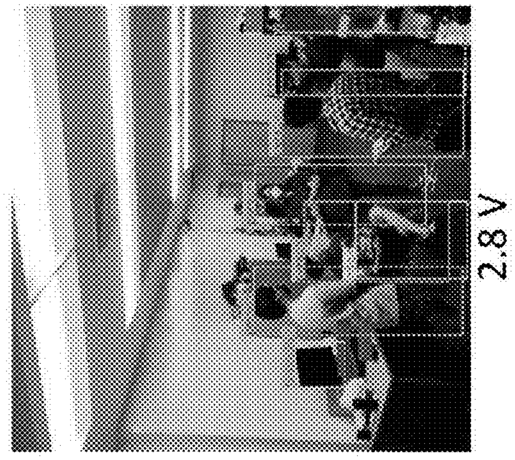
Figure 7D:
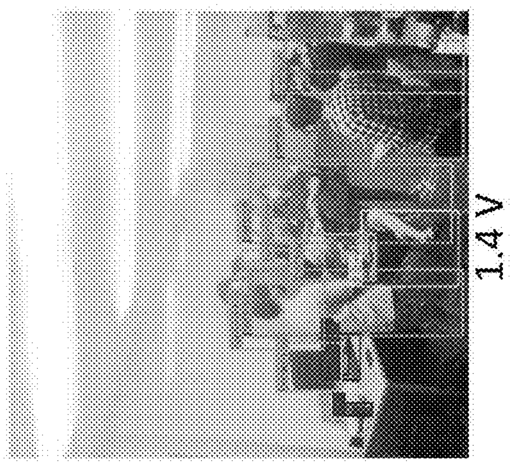

The insensitivity of vision tasks to brightness and noise increase in most situations stems from the fact that neural networks running behind these tasks are usually trained to make themselves immune to intensity and noise changes. That being said, vision tasks still need high fidelity for performing precise object detection, especially under challenging conditions such as dimly-lit scenes, as shown in FIGS. 7A and 7B (captured with camera voltage at 2.8V and 1.4V, respectively). For less challenging scenes, low-fidelity images are observed to provide comparable task performance to their high-fidelity counterparts, as shown in FIGS. 7C and 7D (captured with camera voltage at 2.8V and 1.4V, respectively). For this analysis, images are experimentally captured at different voltage settings from the RPi camera for three different lighting conditions. These images are then fed to a "You Only Look Once" (YOLO)-based people detection task and detection results are compared against ground truth to determine accuracy.

2.4 Motivational Observations

To summarize, the following insights are observed for image sensor voltage scaling:

- Image sensors can be aggressively undervolted far beyond specified operating ranges in the datasheets.
- Aggressive undervolting results in significant camera power savings.
- Aggressive undervolting also makes images brighter and noisier due to the reduced upper bound of the analog voltage range.
- Raised brightness and noise levels in images does not significantly affect vision task accuracy in most situations.

These observations motivate the need for dynamic voltage scaling strategies for image sensors to save energy at sufficient task fidelity. The system outlined herein is developed based on these observations.

3. Design

FIGS. 8A-10 illustrate components of a system 100 for implementation within a visual sensing pipeline for dynamically modifying supply voltage provided to an image sensor 12 (e.g., a camera) of the visual sensing pipeline. The system 100 can include one or more processors in communication with a memory of a computing device 200 (which can embody one or both of edge device 102A and/or server 102B shown in FIG. 9A or edge device 102 shown in FIG. 9B) that determines, for one or more frames to be captured by the image sensor 12, a target analog voltage value for the image sensor 12 based on a voltage requirement of a vision application and in view of an undervolting limit of the image sensor 12. The system 100 can further include a voltage controller 120 that generates an analog voltage having the target analog voltage value and applies the analog voltage to an analog voltage rail of the image sensor 12 as the supply voltage.

The voltage requirement of the vision application can specify a voltage need for the vision application based on a policy or a schedule which may be defined by a user (e.g., a developer); for example, the voltage requirement may specify higher voltages for certain frames and may allow lower voltages than the default nominal voltage for the image sensor 12 for other frames to save power while maintaining proper operation of the vision application when performing a task. The voltage requirement may be in the form of a function call (e.g., "SetCamVoltage ( )") or otherwise defined by a policy or voltage schedule (such as "powersave" or "on-demand") as outlined in further detail herein. The computing device 200 can translate the voltage requirement of the vision application for one or more frames to the target analog voltage value based on a configuration file obtained for the image sensor 12 during a calibration phase, where the configuration file specifies an undervolting limit (which may be a lowest possible supply voltage where the image sensor 12 remains operational) and a noise profile that informs how the undervolting limit affects the outcome of images captured by the image sensor 12. The noise profile can be used by the computing device 200 to drive voltage selection choices.

Design aspirations: Three goals that guide the design of system support for sensor dynamic voltage scaling are outlined through hardware and software extensions.

- Seamless: Vision applications should be able to use the system 100 to reconfigure camera voltage on a frame-to-frame basis without any frame drops.
- Lightweight: Hardware extension of the system 100 should be lightweight with minimal overhead.
- Flexible: Runtime of the system 100 should allow developers to flexibly specify camera voltage needs on a per-frame basis.

Figure 8A:
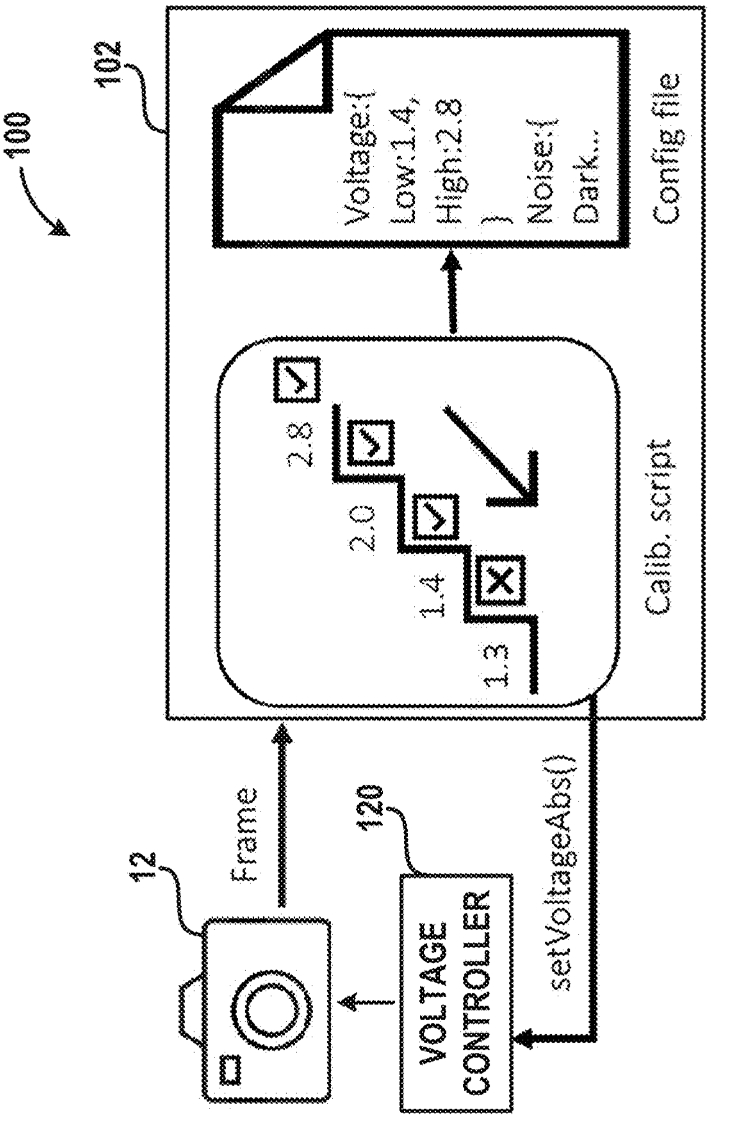
FIGS. 8A-8C are a series of diagrams showing a "calibration phase" (FIG. 8A) and an "execution phase" (FIGS. 8B and 8C) of a system outlined herein.

Calibration and Execution Phases: Two phases are outlined to enable the system 100 to seamlessly work with existing and future visual computing systems, as shown in FIGS. 8A (calibration phase) and 8B (execution phase). FIG. 8C shows data flow between components of the system 100 in the execution phase of FIG. 8B.

(1) To account for variations across sensors, the system 100 goes through a one-time calibration phase shown in FIG. 8A to determine the actual voltage limits and a noise profile of the image sensor 12.

Figure 8B:
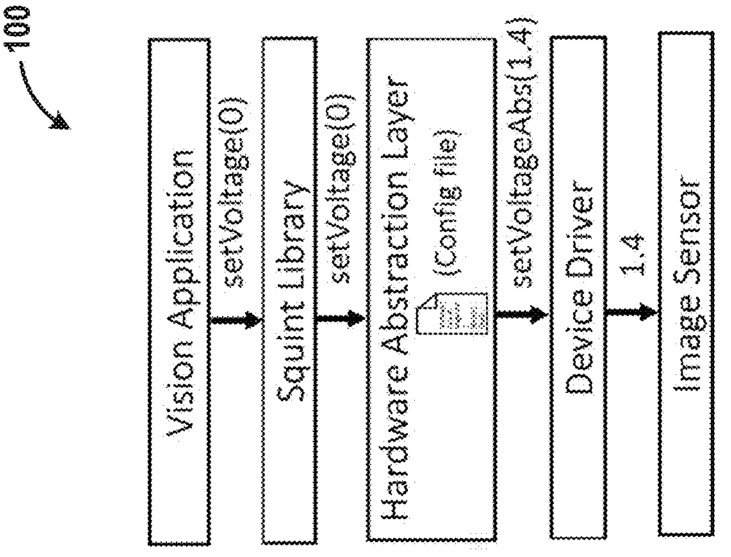
Figure 8C:
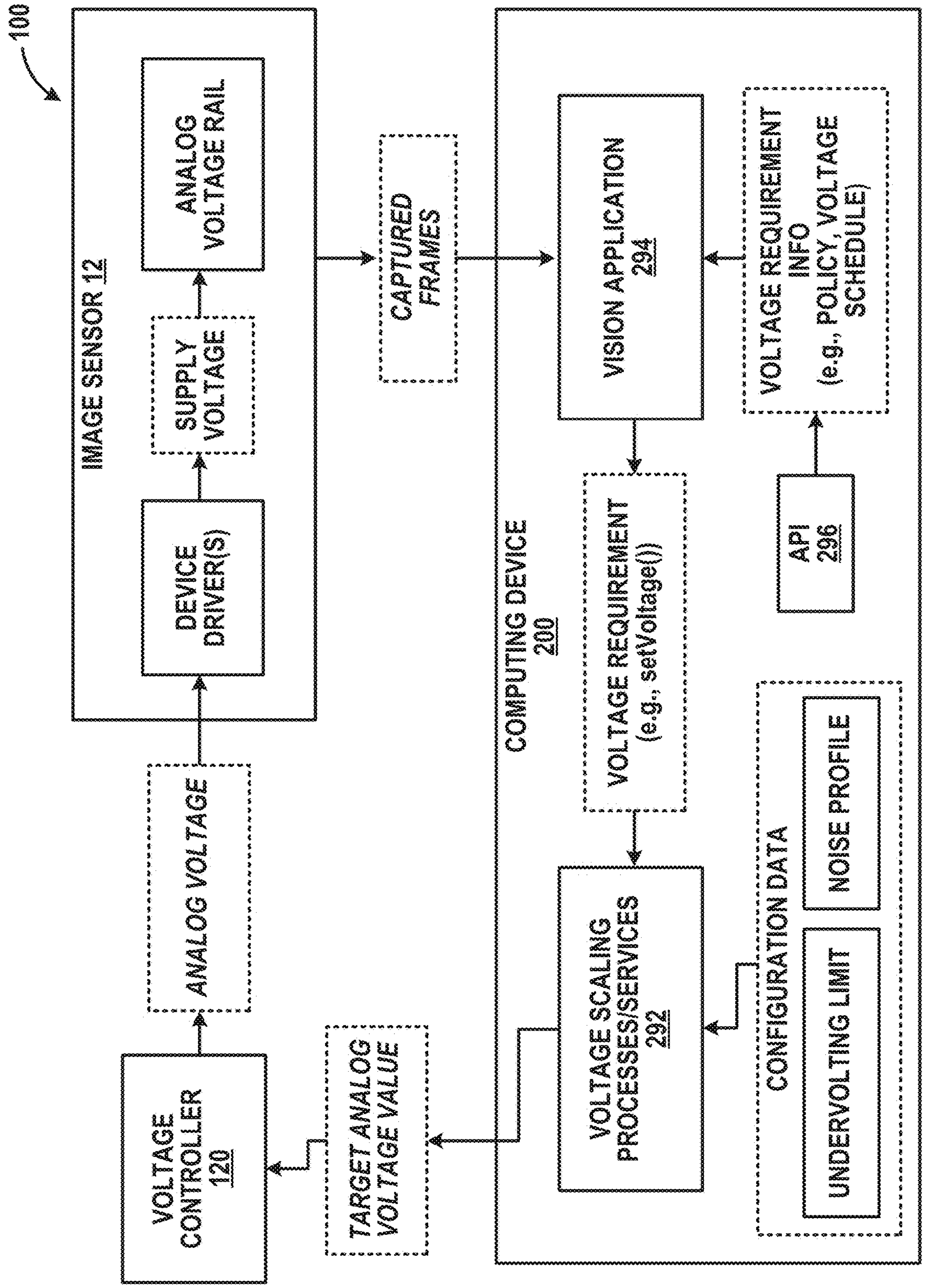

(2) The system 100 then enters an execution phase shown in FIG. 8B to guide policy-based voltage selection based on the calibration information.

(1) Calibration phase (FIG. 8A): During the calibration phase, the system 100 runs a script that automatically sweeps through different camera voltages and determines what set of voltages are usable. The script starts with a default nominal voltage specified in the datasheet of the image sensor 12 and incrementally decreases a voltage value of the supply voltage (e.g., in steps of one tenth of a volt) until the image sensor 12 freezes, after which point the camera voltage is restored to nominal. As the supply voltage is incrementally decreased, the system 100 identifies or otherwise evaluates an operational state of the image sensor (e.g., if the image sensor 12 freezes or otherwise stops working, then the image sensor is in a non-functional operational state; if the image sensor 12 continues to operate, then the image sensor 12 is in a functional operational state). The system 100 determines a lowest usable supply voltage for the image sensor 12, where the image sensor is in the functional operational state when the supply voltage is equal to the lowest usable supply voltage and where the image sensor is in the non-functional operational state when the supply voltage is lower than the lowest usable supply voltage. While it does so, the system 100 also captures one or more calibration frames by the image sensor 12 for noise assessment, and determines a noise profile of the image sensor 12 at one or more voltage values based on the calibration frames. The system 100 commits the voltage limits (e.g., the undervolting limit) and noise data (e.g., the noise profile associated with one or more voltage values) into a configuration file, which could be stored in the hardware abstraction layer of the system stack.

(2) Execution phase (FIGS. 8B and 8C): During the execution phase, the system 100 uses the configuration file generated during the calibration phase to translate the high-level fidelity requirements of the vision application (e.g., the voltage requirement, which may incorporate a user-selected policy or voltage schedule) into an actual set of voltages to be supplied to the image sensor 12. The noise profile recorded in the configuration file during the calibration phase can also be used to drive voltage selection choices. These voltages are sent to the voltage controller 120 of the system 100 which enacts them on the image sensor 12 using standard device-driver mechanisms.

Figure 9A:
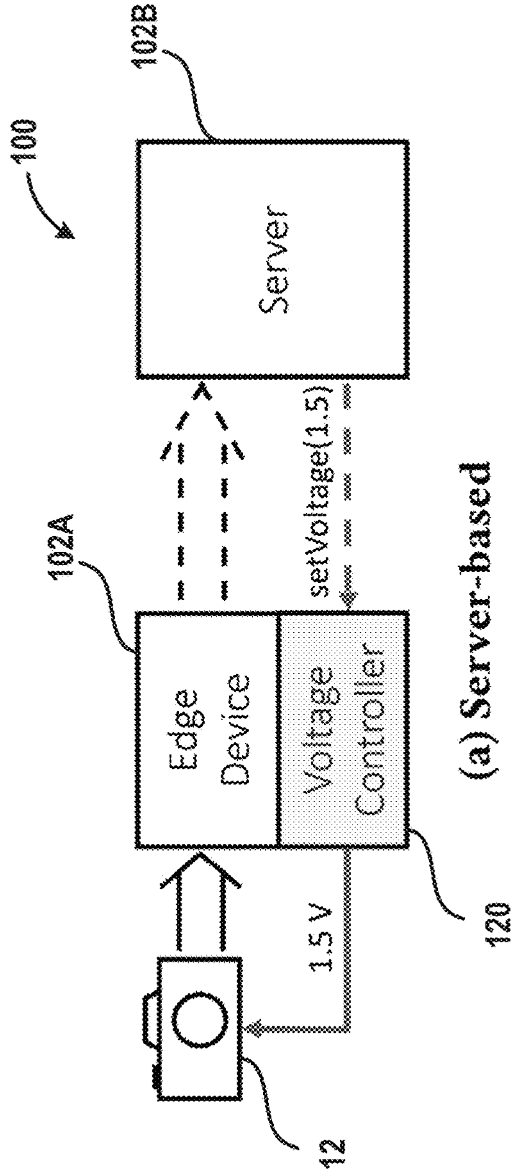
FIGS. 9A and 9B are a pair of diagrams respectively showing server-based and edge-based implementations of the system of FIGS. 8A-8C.
Figure 9B:
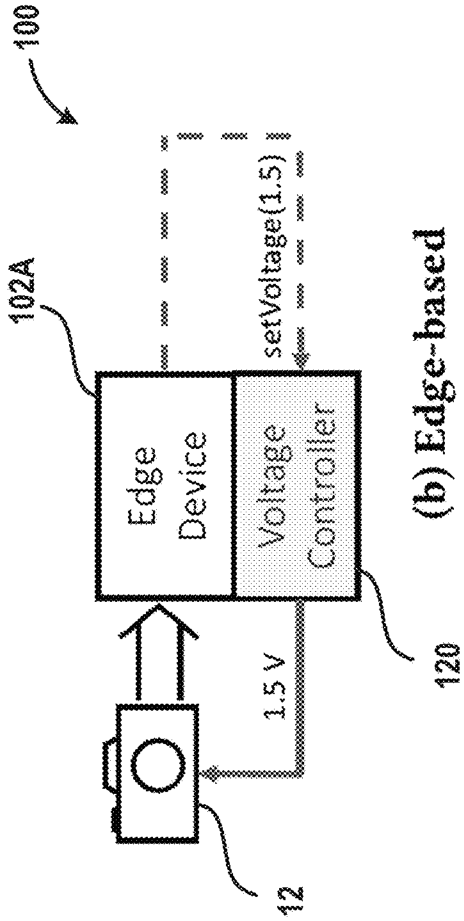

System support: To efficiently run the calibration and execution phases, system support for implementation of the system 100 extends the existing IoT pipeline with necessary hardware and software extensions. These extensions could be integrated into different system incarnations as shown in FIGS. 9A and 9B, such as server-based (FIG. 9A) and edge-based (FIG. 9B), depending on where the vision application runs in the imaging pipeline. In server-based incarnations (FIG. 9A), the vision application runs on a server 102B which issues a voltage request to the voltage controller 120, whereas in edge-based incarnations (FIG. 9B), vision applications run on the edge device 102A itself and directly issue requests to the voltage controller 120. The resulting architecture of the system 100 (e.g., implementing Squint) centers around the idea of adaptively scaling camera voltage for vision application usage. In Section 3.1, the present disclosure outlines design of the voltage controller 120 of the system 100 and its integration with the existing IoT streaming pipeline shown in FIGS. 9A and 9B. In Section 3.2, the present disclosure also describes software runtime for vision application developers to leverage the voltage controller 120 of the system 100 through policy specification.

3.1 Programmable Voltage Controller

Figure 10:
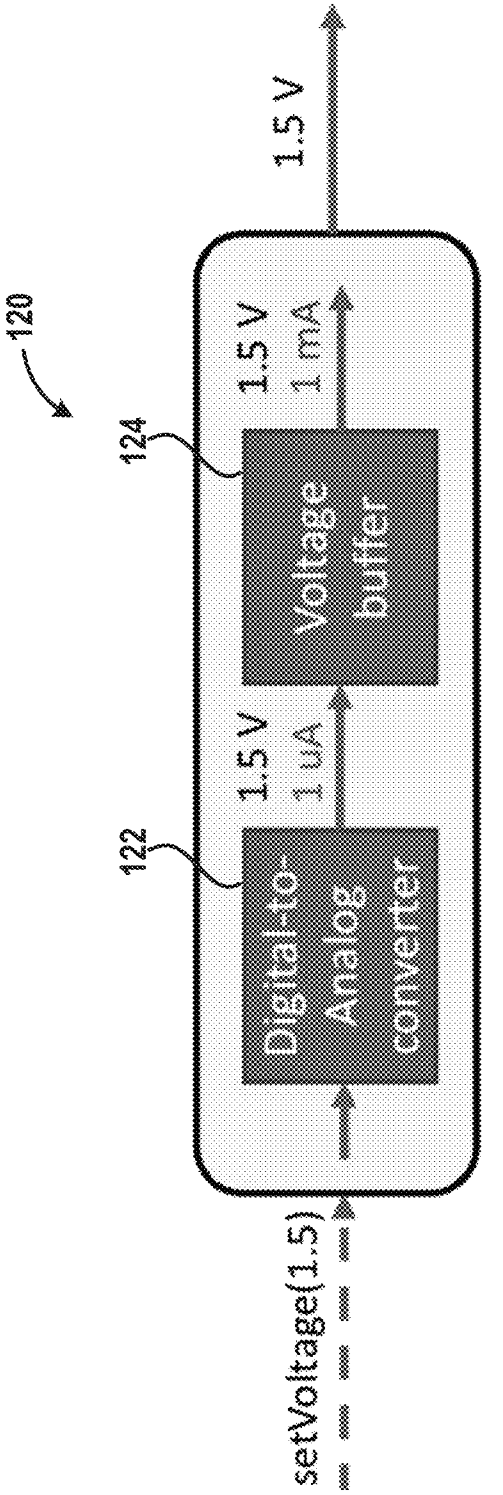
FIG. 10 is a diagram showing a voltage controller of the system of FIGS. 8A-8C.

FIG. 10 shows the voltage controller 120 of the system 100 that intercepts the incoming voltage reconfiguration command from a computing device (e.g., server 102B in FIG. 9A or edge device 102A in FIG. 9B) which can include a target voltage value, and produces an appropriate analog voltage for application to an analog voltage rail of the image sensor 12 to power the image sensor 12. The voltage controller 120 includes a digital-to-analog converter (DAC) 122 to translate digital voltage requests (e.g., indicating the target voltage value) into a corresponding analog voltage, and further includes a voltage buffer 124 to generate sufficient current flow for reliable camera operation. The vision application specifies voltage needs using the designed runtime support in § 3.2.

The DAC 122 of the voltage controller 120 programmatically takes desired voltage from vision application and converts that into equivalent analog voltage to power the image sensor 12. The DAC 122 is supported by the voltage buffer 124 which can be a unity-gain amplifier that generates sufficient current for stable camera operation.

3.1.1 Integration with Edge Device

The voltage controller 120 could easily be integrated as a standalone integrated circuit on top of the edge device 102. Alternatively, the voltage controller 120 can be implemented by repurposing existing Dynamic Voltage and Frequency Scaling (DVFS) controllers inside System-on-Chip (SoCs) of edge devices 102 to generate desired voltages for the image sensor 12, which may entail adding a few extra power modes to meet camera power supply requirements.

3.2 Developer Support

Referring to FIGS. 8B, 8C, 9A and 9B, runtime support for the system 100 is also provided to allow the developers to flexibly specify voltages. For example, this may be implemented by defining a SetCamVoltage ( ) function to allow developers to set a voltage. The SetCamVoltage ( ) function can be part of the voltage requirement of the vision application, which may incorporate a user-defined policy or voltage schedule. Voltage can be set on a per-frame basis or persist across frames. A runtime service running on the computing device (e.g., edge device 102A or server 102B shown in FIG. 9A) receives these calls to send the voltage to the voltage controller 120.

SetCamVoltage (float val, string spec="SNR/Rel/Abs")

In order to facilitate application development by users, multiple levels of abstraction are provided for voltage specification using the system 100. Sensor-agnostic ways are provided to enable developers to configure voltage, such as through "SNR" and relative voltage specification ("Rel"), allowing developers to be unconcerned with the intricacies of imaging and power trends. Additionally, sensor-specific ways to configure voltage are also provided to allow developers to directly set absolute ("Abs") camera voltages.

For relative voltage specification, the system 100 enables developers to specify their desired voltage in [0, 1] range with 0 denoting a low voltage limit and 1 denoting a high voltage limit, regardless of the image sensor 12 being used within the imaging pipeline. The decision to abstract this information is grounded in the observation of the monotonicity of imaging (FIGS. 4A and 4B) and power (FIG. 3) trends.

The runtime service of the system 100 translates developer-provided specifications into appropriate hardware voltages with the help of a "configuration" file generated during the calibration phase (FIG. 8A). The final voltage is then enacted to the hardware of the image sensor 12 through a device driver in communication with the voltage controller 120.

In the example of FIG. 8B, the voltage requirement of the vision application may indicate that the supply voltage needs to correlate with a particular value (shown in the example using the function call setVoltage(0), where "0" denotes a low voltage value).

The system 100 can use a library (e.g., "Squint Library") to determine what the function call means (e.g., where setVoltage(0) indicates that the vision application is using the "relative" voltage specification to request a low voltage value to be applied to the analog power rail of the camera that corresponds with the undervolting limit).

The system 100 can use the configuration file at the hardware abstraction layer to translate or otherwise identify the target analog voltage value based on the function call (e.g., where the undervolting limit is 1.4 volts, and the voltage requirement of the vision application is asking for a voltage that corresponds with the undervolting limit, so the target analog voltage value is 1.4 volts).

The system 100 can then apply the target analog voltage value to the image sensor 12 through a device driver associated with the image sensor 12, which may be achieved using the voltage controller 120. In some examples, the voltage controller 120 can generate the analog voltage that corresponds with the target analog voltage value for application to the analog power rail of the image sensor 12 through the device driver.

3.2.1 Integration with CameraAPI and sysfs Interface

The voltage configuration method enabled by the system 100 could be easily integrated as part of standard CameraAPI. CameraAPI is an application programming interface that allows software developers to interact with a device's camera hardware, including controlling camera settings such as exposure, focus, and zoom, in a platform agnostic manner. By integrating voltage control into the existing CameraAPI, developers can easily configure voltage through a familiar interface.

```
VideoCapture cap(0);
cap.set(cv: :CAP_PROP_EXPOSURE, 0.0167);
cap.set(cv: :CAP_PROP_VOLTAGE, 0.5);
```

The above snippet shows an example integration using the popular OpenCV-based Linux CameraAPI. In this approach, voltage can be defined as a camera property and set to a desired value, similar to other camera settings such as exposure. This method of integration can also be adapted to Android and iOS camera APIs.

Alternatively, voltage control can be integrated as part of sysfs interface to allow developers to configure and query sensor voltage through a standardized interface controlled by the operating system. This approach involves modifying the camera device driver to create voltage as a sysfs file node, which can then be exported to userspace using the sysfs interface. Developers can also directly specify voltage scheduling policy, instead of voltage, to enable automatic voltage control by OS, reducing developer burden.

```
echo 0.5 > /sys/devices/camera/sensor/voltage
echo "Perf" > /sys/devices/camera/sensor/policy
```

3.2.2 Voltage Scheduling Policies

Developers can build various policies that autonomously guide the voltage configuration, in the similar spirit to issuing voltage configurations with the Linux DVFS API on desktop systems and Android's Frequency API on mobile systems. Policies can incur different system overheads, leading to system trade-offs.

A policy should predict voltage progression with time as well as image quality requirements to maximize task accuracy. A simple policy could occasionally operate a camera at high voltage to detect frames and undervolt the camera for tracking the detected objects across frames. Developers can also introduce improved application-specific proxies with other prediction strategies, e.g., with optical flow-based voltage reconfiguration.

Example voltage schedules or policies that may dictate voltage requirements of the vision application on a general or frame-by-frame basis can include, but are not limited to: "powersave" (in which the target voltage value correlates with the undervolting limit), "lightutil" (in which the target voltage value is determined using an ambient light detected by the image sensor), "on-demand" (in which the target voltage value is determined based on a scene complexity detected by the vision application in communication with the image sensor), and "distance-based" (in which the target voltage value is determined based on a perceived distance between an object and the image sensor). In another example correlating with FIG. 1B, an example voltage schedule or policy may require that for a series of frames, the target voltage value corresponds with a higher voltage for certain key frames and corresponds with a lower voltage for intermediate frames.

Figure 11:
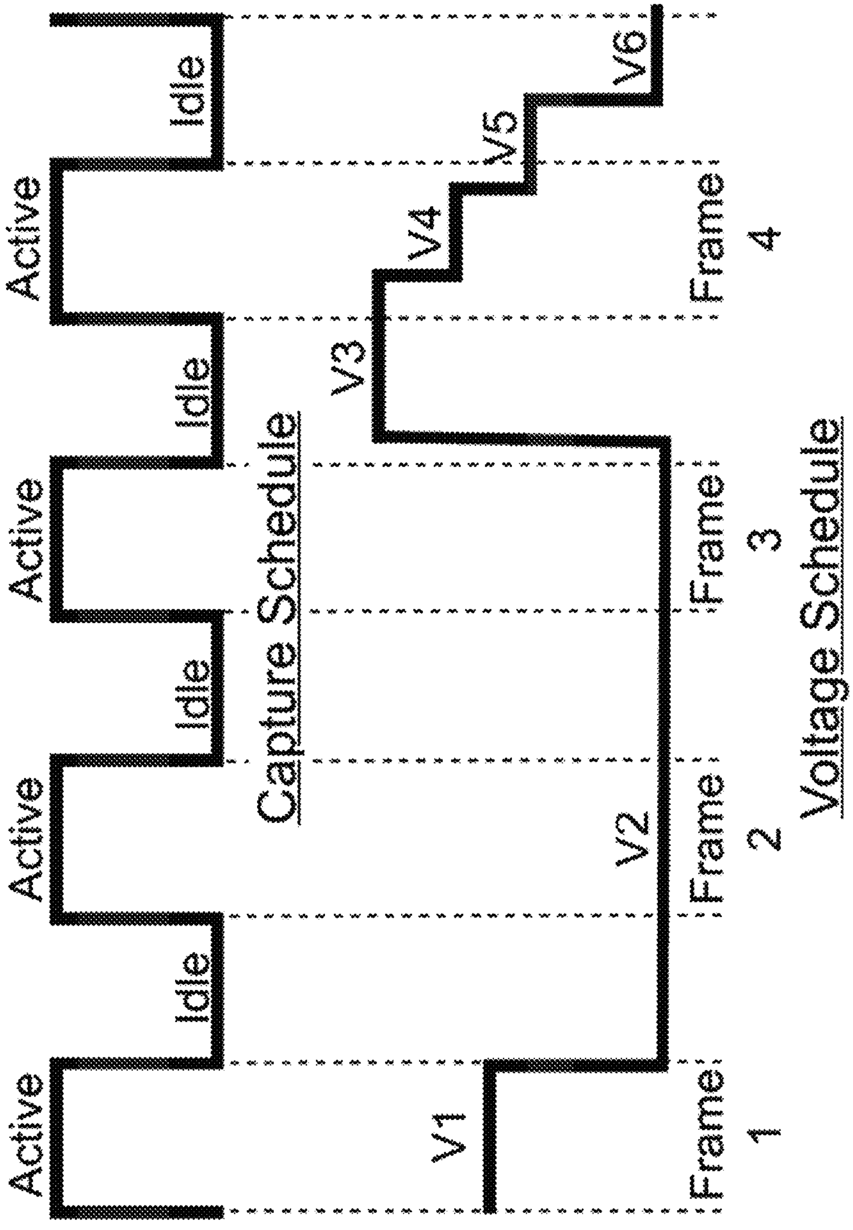
FIG. 11 is a graphical representation showing an example voltage schedule enforced by the system of FIGS. 8A-8C.

Notably, depending on how the voltage schedule is aligned with the camera's capture schedule, different fidelity granularities could be achieved within a single image, as shown in FIG. 11. Modern cameras employ a rolling shutter mechanism that exposes and streams one line of pixels at a time. For coarse-grained fidelity control, the system should sustain the voltage for the entirety of the active frame capture duration. On the other hand, for fine-grained fidelity control, the system could apply different voltages to different parts of the frame.

FIG. 8C summarizes data flow between components of the system 100, particularly during the "execution" phase corresponding with FIG. 8B. A computing device 200 (which may correspond with edge device 102A and/or server 102B in FIGS. 9A and 9B) can communicate with the image sensor 12 and can run a vision application 294 which accesses and processes captured frames from the image sensor 12 in accordance with a task being performed by the vision application 294. The vision application 294 can access voltage requirement information such as a policy or voltage schedule as discussed herein, which can prompt the vision application 294 to set or otherwise communicate a voltage requirement to be applied to the image sensor 12 by the voltage controller 120 for one or more frames (where the voltage requirement can be in the form of a function call such as setVoltage( ) and can correspond with the policy or voltage schedule). In some examples, the voltage requirement information can be provided to the vision application 294 through an API 296, which may be provided by a user or developer.

The computing device 200 can also include voltage scaling processes/services 292 which can intercept or otherwise access the voltage requirement communicated by the vision application 294 (although in some examples, voltage scaling processes/services 292 and vision application 294 can be integral with one another). The voltage scaling processes/services 292 can access the configuration data that was generated during calibration (which includes the undervolting limit and the noise profile) and can use the configuration data to translate the voltage requirement into a target analog voltage value that can be applied as the supply voltage to the image sensor. The voltage scaling processes/services 292 can then use the voltage controller 120 in communication with the image sensor 12 to generate the analog voltage that corresponds with the target analog voltage, and the analog voltage can be applied as supply voltage to the analog voltage rail of the image sensor 12.

Importantly, the target analog voltage value obtained by the voltage scaling processes/services 292 corresponds with the voltage requirement for one or more frames that is called for by the vision application 294 (defined by the policy or voltage schedule that is expressed within the voltage requirement information) in addition to the configuration data for the image sensor. For example, if the vision application 294 is performing a task where the voltage requirement info indicates that a subset of frames can be captured at a lowest possible voltage (e.g., corresponding with the setVoltage(0) example outlined above), then the vision application 294 can communicate to the voltage scaling processes/services 292 that the analog voltage rail of the image sensor 12 should be supplied with the lowest possible voltage, i.e., the undervolting limit. The vision application 294 may not know what the undervolting limit is, as the undervolting limit may vary between image sensor hardware as discussed above, and may instead provide a more general indication of what voltage can be supplied. As such, the voltage scaling processes/services 292 can translate the voltage requirement (request) from the vision application 294 (e.g., using a library such as Squint library) to identify the target analog voltage value for the image sensor 12. In the example where the vision application 294 requests the lowest possible voltage, the voltage scaling processes/services 292 identifies the target analog voltage to be the undervolting limit which is obtained from the configuration data. Further, the voltage scaling processes/services 292 can use the noise profile to drive voltage selection choices as well, e.g., where the voltage scaling processes/services 292 selects the target analog voltage in view of how various analog voltages are known to affect noise within the resultant image for the image sensor 12.

In another example, if the vision application 294 is performing a task where the voltage requirement info indicates that a subset of frames can be captured at a high voltage value (e.g., the status quo for the image sensor), the voltage scaling processes/services 292 will translate the voltage requirement obtained from the vision application 294 to identify the target analog voltage value that corresponds with the high voltage value and instruct the voltage controller 120 to generate analog voltage that corresponds with the high voltage value.

Note that as shown in the example of FIG. 11, the voltage requirement communicated to the voltage scaling processes/services 292 from the vision application 294 may request intermediate voltages other than the highest or lowest possible values as indicated within the voltage schedule or policy. In addition, the voltage requirement may apply for only part of a given frame (e.g., see FIG. 11 where the voltage schedule specifies three different voltages over the span of frame 4).

In some embodiments, the voltage controller 120 can generate the analog voltage and communicate the analog voltage to a device driver of the image sensor, which can in turn provide the analog voltage as a supply voltage to the analog voltage rail of the image sensor.

4. Implementation 4.1 RPi Based System Integration

Figure 12B:
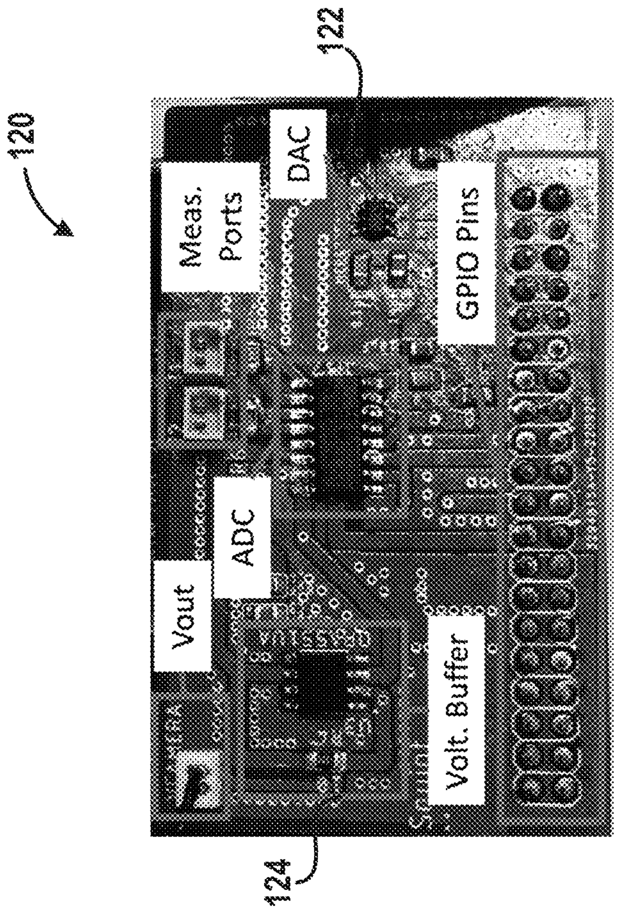
FIGS. 12A and 12B are a pair of photographs showing an example implementation of the system of FIGS. 8A-8C, where
Figure 12A:
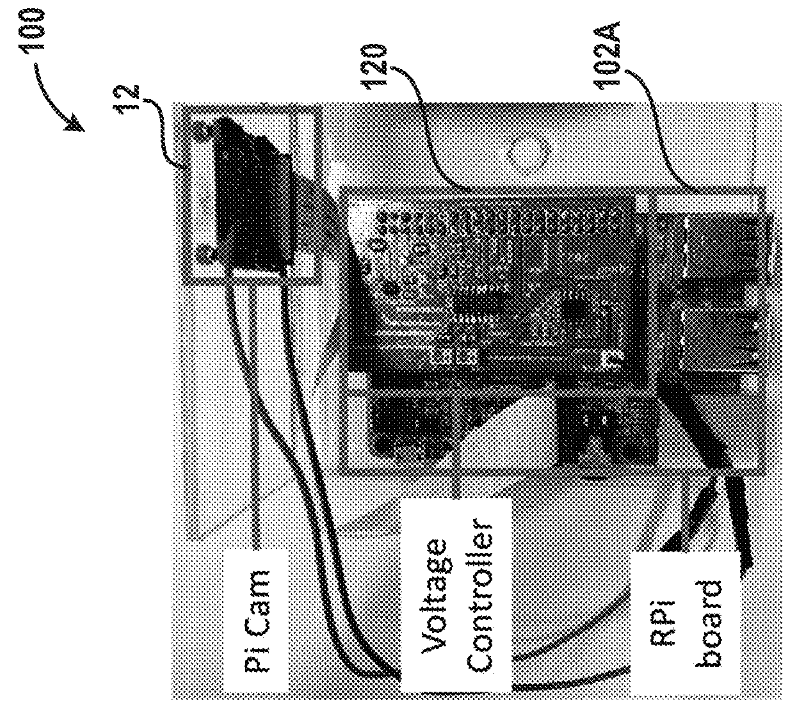

Platform: In one implementation shown in FIGS. 12A and 12B, the system 100 is integrated within an image processing pipeline (gstreamer) around RPi to be representative of a standard video streaming system. The implementation shown in FIGS. 12A and 12B is a server-based incarnation corresponding with FIG. 9A. As shown in Table 2, RPi v2 camera is used as an image sensor 12 (image capture device), connected to a RPi v3B. The RPi can be considered an edge device 102 that consumes the incoming pixel stream from the image sensor 12 and compresses the stream into a compact representation using standard H264 compression techniques. A real-time streaming protocol (RTSP) server (see server 102B of FIG. 9A) is run on the RPi (edge device 102A) that transmits the compressed pixel stream from the edge device over Ethernet to the server. Finally, a server-class Intel Xeon CPU desktop is used to decompresses the compressed pixel stream for performing video analytics, e.g., people detection. The entire image processing pipeline runs in real-time at 24 fps.

TABLE 2

System components in the IoT streaming pipeline

| Component | Specification |
|---|---|
| Camera | RPi Cam v2.1, Sony IMX219, 4K @ 60 fps |
| Edge device | RPi v 3B, quad-core Cortex-A53, 1 GB RAM |
| Network | 300 Mbps Ethernet |
| Server | Intel Xeon CPU E5-1620, 32 GB RAM |

Voltage controller: In one example implementation, the voltage controller 120 (FIG. 12B) is built as a fully programmable module using off-the-shelf components. Specifically, for the purposes of the demonstration and evaluation, a MCP4725 12-bit DAC (Microchip) is used for the digital-to-analog converter 122 of the voltage controller 120 and OPA551PA operational amplifier (Texas Instruments) is used to build the voltage buffer 124 of the voltage controller 120 that generates sufficient current for stable camera operation. In this implementation, the voltage controller 120 is integrated as a standalone module, powered and interfaced through the 12C interface of the RPi. The voltage controller 120 takes voltage configuration commands from the RPi and generates the desired voltage to power the analog voltage rail of the image sensor 12.

Runtime: In the example implementation, the runtime is implemented as a filesystem interface (§ 3.2) using a stateless networking service protocol. Specifically, a RESTful API is implemented to handle voltage configuration requests from the vision applications running on the server (server 102B shown in FIG. 9A). A simple web service running on the RPi (edge device 102A) forwards these voltage configuration requests to the voltage controller 120 of the system 100 over the 12C interface.

4.2 Workloads

YOLO-based people detection is used for benchmarking, which localizes and tracks people in a scene to allow for counting analytics and potential security responses. This would be representative of multiple IoT video analytics applications that may be demanded of an image processing pipeline that implements the system, such as counting people entering and leaving a hiking trail entrance or analyzing shoppers' buying activity for automated checkout. Additionally, a preliminary investigation of OpenCV marker-based camera pose estimation (a "backbone" for augmented reality tracking tasks) is also conducted. This would be representative of multi-camera AR systems such as Microsoft Hololens.

4.2.1 Benchmarks

Since existing datasets include images taken at nominal camera voltage and the undervolting image artifacts are difficult to simulate, a custom image dataset is constructed for validation of the system based on real image captures at different camera voltages. Specifically, the dataset represents two real-life scenarios:

Entrance detection: people entering and leaving a scene.

Person tracking: people randomly standing around in a room holding casual discussions in places such as office cafeterias.

The dataset exhibits variations in lighting, object density, and object proximity, making it a viable proxy for real-life scenarios. Five people were recruited with consent for staging the dataset. Participants were instructed to move in specific patterns that emulate entrance detection and person-tracking in cafeteria scenarios mentioned above. During the movements, the ambient light was varied using a controllable analog light source. Specifically, each capture included six minutes of video data with two minutes of high light, two minutes of medium light, and two minutes of low light in each capture.

The experimental RPi camera in communication with the system was used to stage the dataset at different voltages, while the participants emulated the scenarios. In addition to the experimental RPi camera, a ground truth camera was also used for ground truth captures of the same scene that always operates at nominal voltage. The experimental and ground truth cameras were placed in close proximity so that they see the same scene with negligible parallax. Overall, the dataset includes 73,066 images.

For marker-based pose estimation, a limited dataset was constructed using the same setup as above. For this workload, the marker was placed at three different distances and three different orientations with respect to the experimental and ground truth cameras.

4.2.2 Baselines

The workloads are tested against the following baselines:

System (Squint or "Sq-X"): The system supplies the desired voltage to the camera based on the vision application's fidelity needs. Here "X" denotes the policy used for voltage scaling. Notably, the system operates the camera at extreme voltages, i.e., 2.8 V and 1.4 V, for RPi camera, since there is no incentive to operate in between, as discussed in § 2.

Reduced resolution (RR): Instead of modulating voltage as implemented by the system, an RR system used for benchmarking changes capture resolution based on fidelity needs. The RR system configures the camera at 1080p for high fidelity and at 480p for low fidelity.

4.2.3 Metrics

Here, different evaluation metrics are discussed.

Task accuracy: Standard metrics from computer vision literature are used to evaluate the workloads. For the people detection workload, intersection over union (IoU) is used as the metric. IoU measures the amount of overlap between estimated and ground truth detections. A detection is considered a true positive (TP), if the IoU score is above a certain threshold. Otherwise, it is considered a false positive (FP). The final detection accuracy is obtained by determining the number of true positives among all the detections, i.e., TP/(IP+FP), for each frame, which is known as mean average precision (mAP). The final mAP is obtained by averaging individual mAP scores across all frames. On the other hand, for marker-based camera pose estimation workload, translational error and rotational error are used as the metrics. These are derived by computing the L2 norm of estimated pose against ground truth pose.

Power: Different camera power rails are sampled every 0.1 ms to measure their respective current draws. The current draw is multiplied with the voltage of each rail and summed over all the rails to get the sensor power. Sensor power readings are analyzed across different samples to report power trends.

Overhead: Voltage reconfiguration time of the API of the system is determined by measuring a time difference between a voltage reconfiguration request sent by the vision application and an acknowledgement notification received from the RPi's web service. The reconfiguration time is measured across multiple voltage requests to report trends. On the other hand, to report power overhead of the voltage controller module, worst-case power estimates from the component datasheets are used.

4.2.4 Policies/Parameter Choices

The noise profiles that were used for voltage scheduling policy evaluation were mainly based off RPi camera mentioned in Table 2. That being said, similar trends can be observed, i.e., low voltage triggering more noise, for other image sensors such as the ones from OnSemi and OmniVision.

The following policies are evaluated in a similar spirit as CPU's DVFS policies:

Performance (Perf): The system sets the sensor voltage to the highest possible setting, providing maximum task performance but potentially consuming more power and generating more heat. This is representative of status-quo.

Powersave (Pwr): The system sets the sensor voltage to the lowest possible setting to save power.

Random (Rand): To demonstrate the effectiveness of flexible voltage reconfiguration, a random policy is mapped whereby the system generates a random number from 1.4 to 2.8, and supplies that voltage to the image sensor.

Lightutil (Light): The system uses ambient light sensor's reading to determine the optimal voltage setting for the current workload. The system uses a lighting-voltage lookup table that is obtained from sensor characterization to guide the voltage selection process.

For the evaluation, the system occasionally captures a high-fidelity image, computes its average pixel intensity, and uses it as a proxy to estimate the ambient lighting of a scene. If the light estimate is greater than a certain threshold, the system supplies 1.4 V to the sensor; otherwise, the system supplies 2.8 V to the sensor, as guided by the characterization curves discussed in § 2.

On-Demand (OD): The system sets the sensor voltage to the lowest possible setting when the scene is idle and scales the voltage up as scene complexity increases. Specifically, the system computes IoU score across detection results of previous frames to determine the staticness/dynamism of a scene's objects and uses the IoU score to appropriately determine the desired sensor voltage.

A larger IoU score across frames indicates that the scene is fairly static. In such scenarios, the system supplies 1.4 V to the camera to continue to track the existing objects. On the other hand, a lower IoU score across frames indicates large motion in the scene, including people entering and exiting the scene. In such scenarios, the system supplies 2.8 V to the camera for high quality detections.

Distance based (Dist): A distance-based policy is used for marker-based camera pose estimation workload, whereby the system adapts voltage based on proximity of marker with respect to the camera. The system supplies a low voltage (1.4 V) to the camera when the marker is close to the camera, and supplies a high voltage (2.8 V) when the marker is located far from the camera for precision.

5. Evaluation 5.1 the Usage of Squint is Flexible, Seamless, and Performant

Figure 13A:
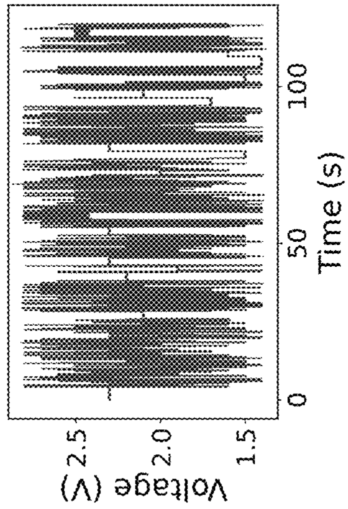
FIGS. 13A-13C are a series of graphical representations showing bright light voltage schedules generated by the system of FIGS. 8A-8C for different policies applied to an "entrance detection" dataset, including a random policy (FIG. 13A), a light-based policy (FIG. 13B), and an on-demand policy (FIG. 13C)
Figure 13B:
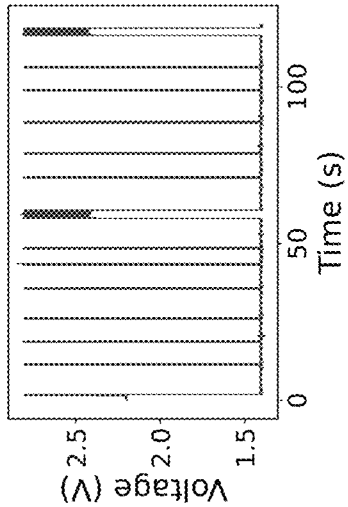
Figure 13C:
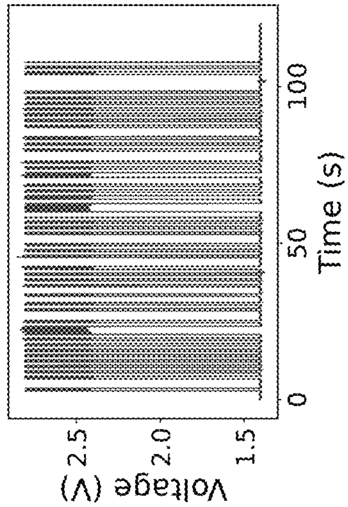
Figure 14A:
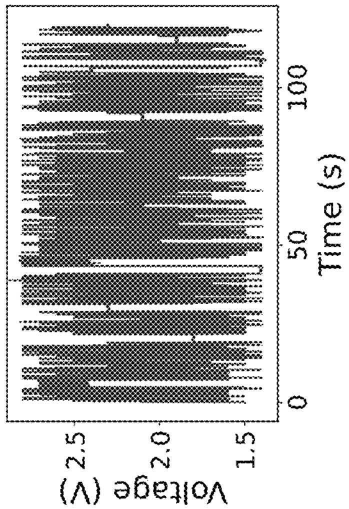
FIGS. 14A-14C are a series of graphical representations showing bright light voltage schedules generated by the system of FIGS. 8A-8C for different policies applied to a "person tracking" dataset, including a random policy (FIG. 14A), a light-based policy (FIG. 14B), and an on-demand policy (FIG. 14C)
Figure 14B:
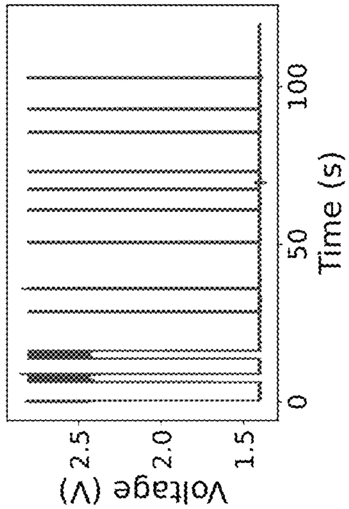
Figure 14C:
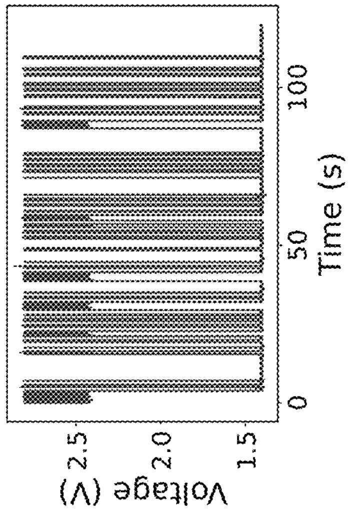

FIGS. 13A-13C show Bright Light Voltage schedules generated by the system implementing different policies for Entrance detection dataset. FIGS. 14A-14C show Bright Light Voltage schedules generated by the system implementing different policies for Person tracking dataset.

The runtime of the system flexibly allows apps to configure full swing of sensor voltages on a frame-to-frame basis without any restrictions. The voltage schedule for random policy shown in FIGS. 13A and 14A indicates that the API is flexible enough to randomly configure sensor voltage anywhere from 1.4 V to 2.8 V. On the other hand, the system operates the image sensor at extreme voltages, either 1.4 V or 2.8 V, for Lightutil (FIGS. 13B and 14B) and On-Demand (FIGS. 13C and 14C) policies, because in this case there is little power/performance incentive to operate at an intermediate voltage, as mentioned in § 2.

The system was found to choose a different voltage schedule for different policies for a given scenario. For instance, an On-Demand policy schedule (FIG. 13C) has a denser schedule than Lightutil (FIG. 13B), because On-Demand is motion adaptive, and motion changes are frequent in both the entrance detection and the office cafeteria scenes. Lightutil, on the other hand, has a sparser schedule because Lightutil is light adaptive and light changes are less frequent in the scenes.

In addition to variation across policies, it is observed that the same policy causes the system to select a different voltage schedule for different scenarios. For instance, one can see On-Demand having a denser schedule for the entrance detection scenario (FIG. 13C) compared to On-Demand for a person tracking in cafeteria scenario (FIG. 14C), as there is large motion involved in the former due to people constantly entering and leaving the scene as opposed to the cafeteria one where people are fairly static.

While the runtime configures different voltages for different policies, the system is able to stream frames seamlessly without any noticeable frame drops. By doing so, the system is able to provide a consistent real-time pipeline performance of 24 fps for all the evaluated workloads.

Notably, voltage configuration requests that are executed while the sensor is actively capturing an image are found to result in different parts of the frame possessing different qualities. This is due to rolling shutter sensor operation whereby different lines of pixels are read at different voltage configurations. Such artifacts are noticed during the dataset collection with more artifacts appearing when rapidly changing voltages. This opens up an opportunity to design more fine-grained voltage scheduling policies that can sample different parts of a frame, as mentioned in § 3.2.

Figure 15A:
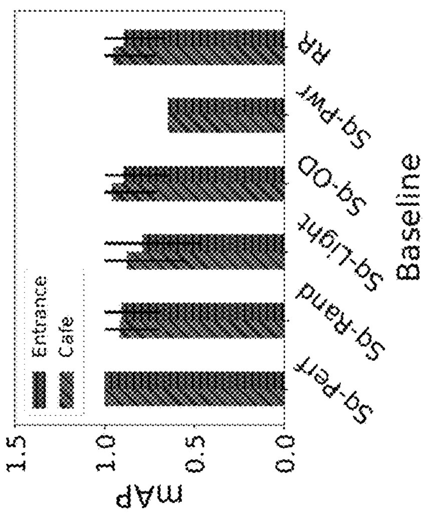
FIGS. 15A and 15B are a pair of graphical representations respectively showing task accuracy and power consumption of a visual sensing pipeline for a people detection task by the system of FIGS. 8A-8C for different policies and compared with a reduced resolution method.

Algorithms are still reliable. Task accuracy is fairly maintained for people detection workload, while policies choose different voltage schedules during system execution, as shown in FIG. 15A which shows task accuracy for a people detection task. Notably, On-Demand ("Sq-OD") has slightly better accuracy than Lighutil ("Sq-Light") because it is adaptive to both light and motion in the scene. Random policy ("Sq-Rand") has comparable performance to Lightutil because the system randomly modulates the sensor supply voltage with an average operating voltage landing in the middle. At this average intermediate voltage, the frame quality is comparable to the frame quality at a nominal voltage. Lower accuracy for Powersave policy ("Sq-Pwr") is due to continuous low voltage operation, regardless of scene dynamics. On the other hand, reduced resolution (RR) baseline also provides consistent accuracy as neural networks, by design, are typically trained to perform well at low input resolutions, e.g., 300×300 for YOLO.

In FIG. 15A, note that the accuracy varies quite a lot within a policy as indicated by the large error bars. This variation is mainly because of varying scene dynamics pertaining to occlusion, object proximity, and contrast difference in the dataset. Specifically, the difficult scene situations such as people occluding one another, people standing far from the camera, and natural contrast differences due to non-uniform illumination in the room are found to result in lower task accuracy, and vice-versa.

Figure 16A:
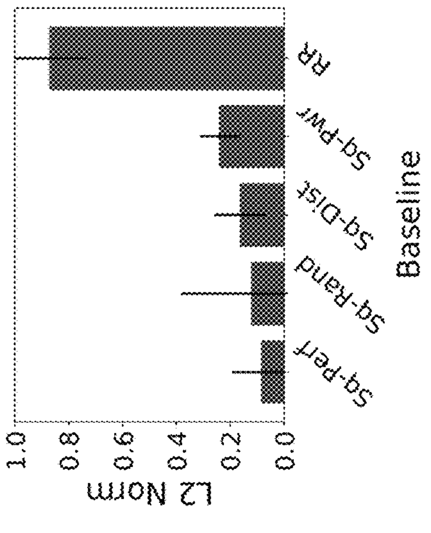
FIGS. 16A and 16B are a pair of graphical representations respectively showing task accuracy and power consumption of a visual sensing pipeline for a camera pose detection task by the system of FIGS. 8A-8C for different policies and compared with a reduced resolution method.

For marker-based pose estimation workload, the accuracy is also maintained for distance based policy ("Sq-Dist") as the system adapts sensor voltage based on the marker's proximity with respect to the camera, as shown in FIG. 16A for camera pose detection. On the other hand, reduced resolution baseline adapts sensor resolution based on marker distance from the camera. One can see that reduced resolution baseline has a slightly larger error than the system (as Sq-Perf, Sq-Rand, Sq-Dist, or Sq-Pwr), mainly because higher resolution does not help with pose tracking in dimly-lit office environments unlike the system which helps with tracking by adding brightness to the signal.

5.2 the Usage of Squint is Energy-Efficient

Figure 15B:
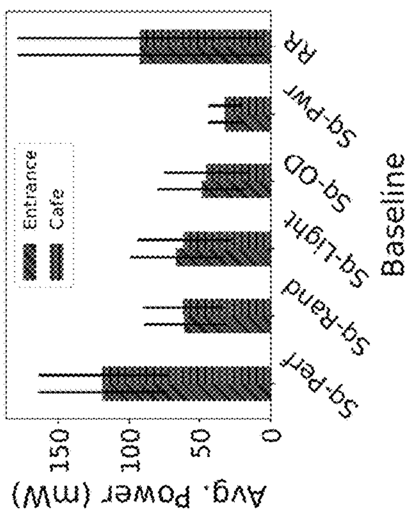
Figure 16B:
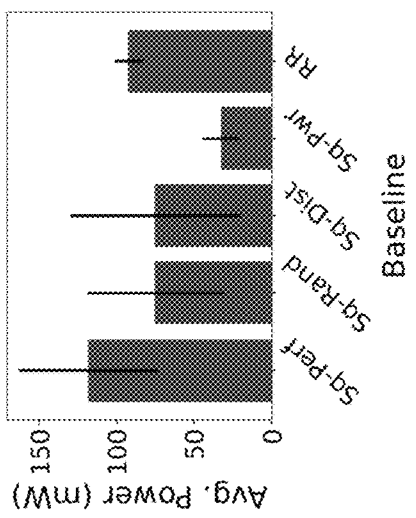

Imaging using the system leads to significant camera power savings due to aggressive undervolting (up to 73% for evaluated policies reported herein). The actual amount of power saved directly depends on the voltage schedule chosen by a policy. A sparser voltage schedule with more low voltage operation, such as the one with Lightutil policy (Sq-Light) under "Bright" light, results in more savings, whereas a denser voltage schedule with more high voltage operation, such as the one with On-Demand policy (Sq-OD) under "Bright" light, results in relatively less savings. However, if we consider all lighting conditions, Lightutil has an overall higher power consumption than On-Demand, as shown in FIG. 15B. This is because Lightutil always selects high voltage under low-light conditions, whereas On-Demand selects both high and low voltage based on scene dynamics. Similar trends are observed for camera pose estimation workload as shown in FIG. 16B.

Figure 17:
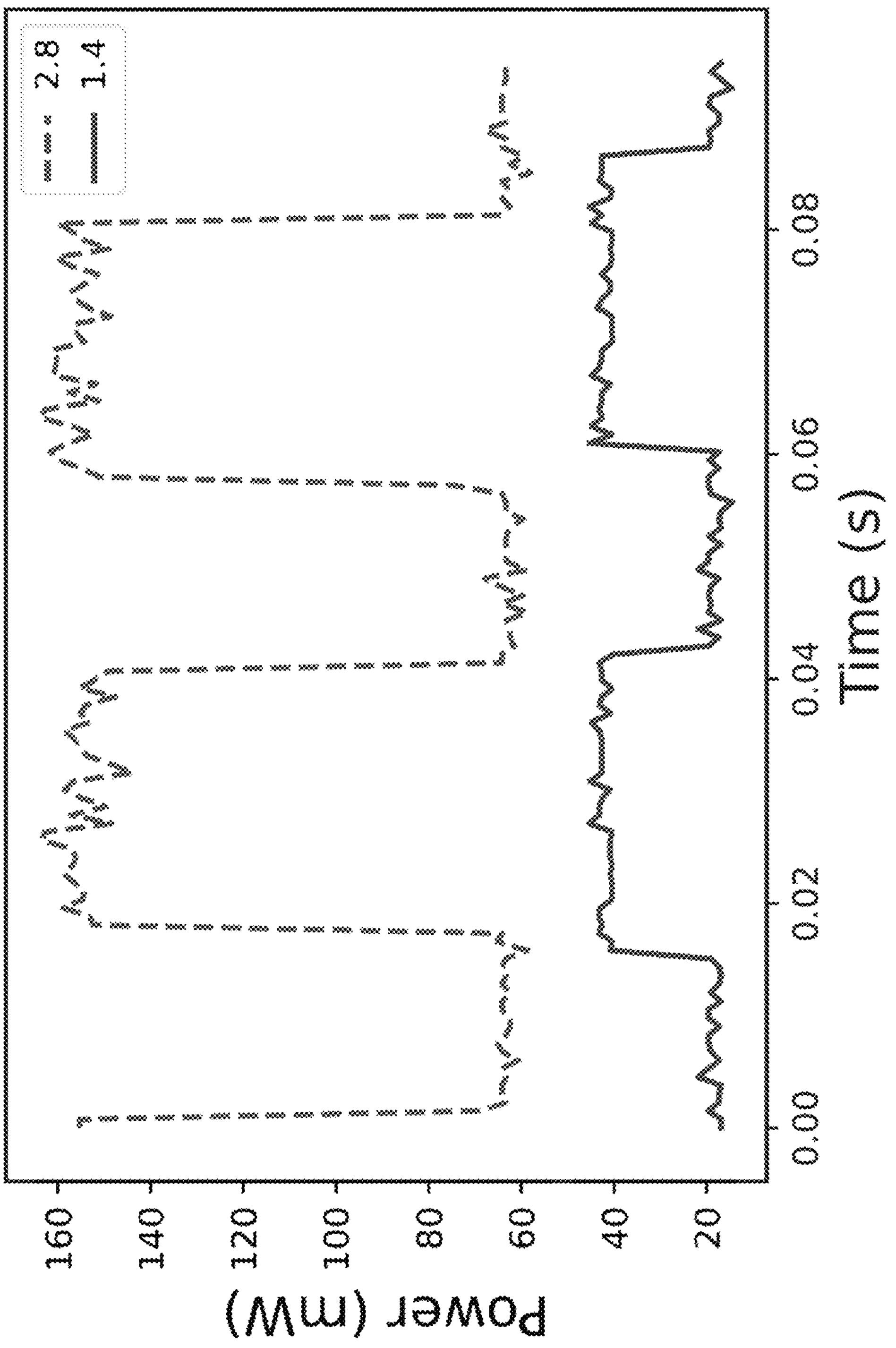
FIG. 17 is a graphical representation showing power trace over time for different sensor voltages.

FIG. 17 shows the experimental power trace corresponding to two different voltages (2.4V for dotted line, 1.4V for solid line). As shown, for a given supply voltage, the image sensor alternates between active and idle states with different timing and power profiles for each of those states. While the system switches the supply voltage provided to the image sensor, the power profiles of active/idle states are observed to shift while their timing remain intact. Decreasing the active state duration through aggressive standby techniques is hypothesized to lead to even more savings.

Substantial camera power savings would significantly extend the battery life of battery-backed IoT systems. Specifically, for ultra-low power IoT systems such as the ones built around Cortex-M processors, sensing contributes to a major chunk of system energy. In such systems, a large sensor power savings resulting from imaging techniques implemented by the system could potentially extend battery life from a few hours to a few days. Such low power profile systems could be powered from energy harvesting sources, e.g., solar cells, and this would eventually pave the way for battery-less systems.

Meanwhile, reducing capture resolution (RR) baseline also results in noticeable sensor power savings. This is because the image sensor samples fewer pixels at lower resolutions, thereby reducing burden on analog readout. Image sensors typically adopt a binning mechanism for image sub-sampling, whereby low-resolution images are achieved by averaging pixels over a window. This means all pixels in the imaging array are activated, typically at a higher resolution, but only a few of them are readout after an averaging process based on the desired resolution. Since readout is far more power hungry than pixels, reducing resolution helps with energy-efficiency. The voltage scaling techniques of the system could be combined with resolution adaptation techniques to further compound energy savings.

5.3 the Hardware and Software Extensions are Lightweight

Voltage controller is power and area efficient: The voltage controller of the system consumes <1 mW of power during system operation, which is negligibly small in comparison to the camera power savings. The voltage controller can be built as a standalone PCB module mainly with three components, which could be easily integrated into existing camera systems. Miniaturization efforts such as building the voltage controller into an integrated circuit form factor using the state-of-the-art fabrication technology would lead to much higher power and area efficiency.

Voltage configuration API is performant: In the example implementation of the system discussed herein, the API takes about 10 ms to switch the camera voltage. Since 10 ms is within a frame period (33 ms), the API enables the system to seamlessly switch sensor voltages on a frame-by-frame basis.

6. Direct Comparison with Related Work

Dynamic voltage scaling in CPUs: The idea to dynamically scale voltage provided to a component has been extensively used in microprocessors since the early 1990s. In case of CPUs, undervolting helps conserve processor power and cools down the chip, but at the cost of performance. Overvolting, on the other hand, helps increase processor performance allowing for higher frequency operation. CPU voltage scaling is usually combined with clock frequency scaling for power and performance gains, and the mechanisms to enable such gains are popularly referred to as DVFS in the architecture community.

Similar to CPU undervolting, the system undervolts image sensors to conserve power. Furthermore, while undervolting CPUs degrades application's performance, undervolting image sensors can degrade imaging fidelity of an application. However, unlike CPU voltage scaling techniques which adapt the voltage of digital circuits, the sensor voltage scaling techniques of the system adapt the voltage of analog circuits for significant power savings.

Sensors for power efficiency: Designing image sensors that can operate on lower analog power supplies has been an emerging trend in the image sensors community to promote sensor's power efficiency. Samsung recently designed two such imagers with different resolution and pixel sizes, which use 2.2 V supply to power all their analog circuitry. Since lowering pixel voltage causes fidelity issues stemming from decreased voltage swing and backflow of charge into photodiodes, several circuit-level changes have been made to compensate for those issues.

Many researchers in academia designed power-efficient sensors as well. One work designed a dual voltage-mode camera that can operate in high-fidelity imaging mode (3.3 V) and low-power vision mode (0.9 V) to save power. Another work designed a low-power IoT camera that has power consumption proportional to frame rate, using a hierarchical column multiplexer and variable capacitance buffer. Yet another work explored clock scaling and aggressive standby techniques for sensor energy-efficiency. Another work proposes an approach to dynamically scale frequencies and voltages of image sensor's digital circuits within a frame to save power during vertical blanking period.

Similar to these works, the system outlined herein lowers the analog voltage of an imaging sensor to save power consumption. However, in contrast, the undervolting mechanisms of the system outlined herein do not require explicit changes to the sensor design and can be directly applied within an imaging pipeline for off-the-shelf cameras.

Systems for efficient visual computing: Many researchers proposed visual systems that can programmatically configure different sensors' parameters to achieve desirable system trade-offs. One group adapts the temperature of a 3D stacked sensor by varying the amount of near-sensor processing to trade thermal noise with system energy, and migrates the vision task between near-sensor and far-sensor VPU in a duty-cycled fashion to regulate temperature.

Another group adapts sensor resolution on a frame-level granularity to trade task accuracy with system energy, by avoiding repeated memory allocation. Rhythmic Pixel Regions is one technique that adapts sensor resolution on a region-level granularity for fine-grained accuracy-energy trade-offs, through a encoder-decoder architecture. The system outlined herein is in the similar spirit as these works, however, the system reconfigures the analog voltage of the system to trade sensor energy consumption with imaging fidelity.

7. Future Directions

Network friendliness: Many IoT systems deployed in the wild are constrained by network bandwidth and use ultra-low bandwidth protocols such as LoRA to communicate between edge device and server. The voltage reconfiguration API of the system requires only a few bytes of data per request, thereby not burdening the network interface. To make the system even more network friendly, better data transmission protocols and intelligent ways to configure voltage can be explored. For instance, the system could occasionally send voltage requests that apply for a grouping of frames instead of sending requests on a per-frame basis.

Voltage scheduling policies: While the present disclosure mainly explores policies that generate coarse-grained voltage schedules enabling fidelity control on a per-frame basis, the system also allows generating fine-grained voltage schedules enabling fidelity control on a per-line basis within a frame. Such fine-grained schedules may have to be generated in tandem with rolling shutter-based camera capture schedules to allow sampling different parts of the frame at different desirable fidelities, which could be interesting for applications such as semantic segmentation. This fine-grained voltage scheduling would also lead to more sensor power savings.

The policies explored herein also operate the imaging sensor at extreme voltage levels as there is little incentive to operate the sensor at an intermediate voltage level for vision tasks. However, as mentioned in the characterization section, intermediate voltage level might be useful in low-light situations whereby undervolting adds brightness to the signal without adding too much noise. As such, the system could be adapted to determine and apply intermediate voltage levels as needed.

Dynamic frequency scaling: While the present disclosure focuses on studying effects of voltage scaling on the analog circuitry of the sensor, as a natural extension, power and performance implications of clock frequency scaling on the sensor's digital circuitry can also be studied. Notably, it may be beneficial to explore how analog voltage scaling would work in tandem with digital clock scaling to provide desired fidelity and frame rate needed for vision applications.

Voltage scaling on other camera types: In the present disclosure, the implications of voltage scaling as enforced by the system on 2D image sensors are studied. However, the system can also be applied to other visual sensor modalities such as depth cameras and event cameras. Specifically, the effects of voltage scaling on different sensing and readout patterns of off-the-shelf depth and event cameras can be studied in the context of emerging 3D vision and eye tracking applications, respectively.

In summary, existing visual computing systems supply fixed voltage to power analog circuitry of a visual sensor which can limit the energy-efficiency of the sensor. The system outlined herein overcomes the limitation by allowing systems to aggressively undervolt sensor's analog voltage for significant efficiency gains. System support is developed to dynamically adapt sensor voltage from vision applications through a programmable voltage controller hardware and a voltage configuration API software. With the hardware and software interfaces of the system outlined herein, efficacy of voltage scaling for image sensors is demonstrated through different scheduling policies that may be applied by the system. The system outlined herein can be considered an early step towards imaging-aware voltage scheduling techniques for IoT and augmented reality systems.

9. Computer-Implemented System

Figure 18:
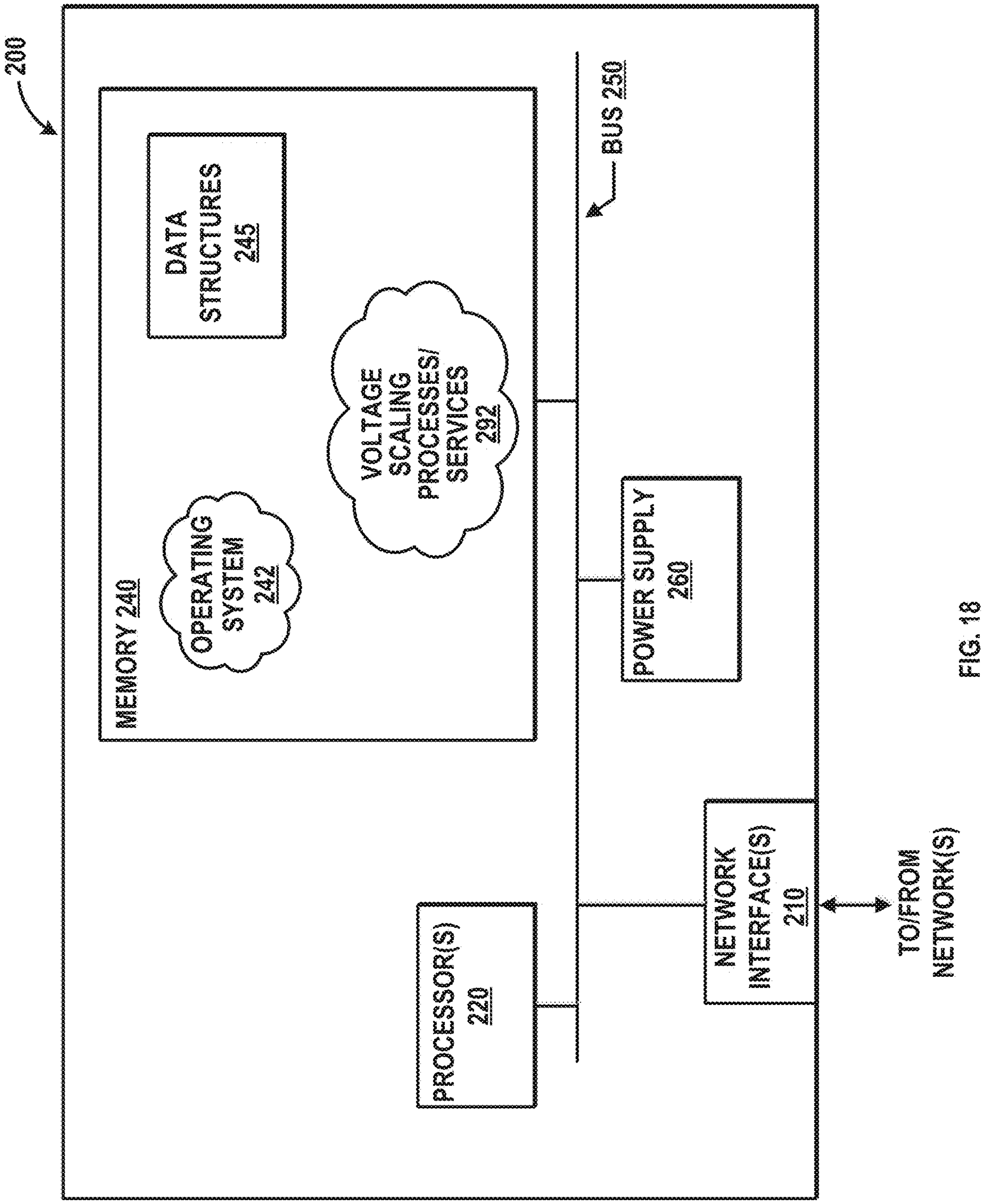
FIG. 18 is a simplified diagram showing an exemplary computing system for implementation of the system of FIGS. 8A-8C.

FIG. 18 is a schematic block diagram of an example device 200 that may be used with one or more embodiments described herein, e.g., as a component of system 100 as computing device 200 (FIG. 8C) and/or vision pipeline such as edge device 102A and/or server 102B shown in FIG. 9A, or as edge device 102 shown in FIG. 9B.

Device 200 comprises one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over the communication links coupled to a communication network. Network interfaces 210 are configured to transmit and/or receive data using a variety of different communication protocols. As illustrated, the box representing network interfaces 210 is shown for simplicity, and it is appreciated that such interfaces may represent different types of network connections such as wireless and wired (physical) connections. Network interfaces 210 are shown separately from power supply 260, however it is appreciated that the interfaces that support PLC protocols may communicate through power supply 260 and/or may be an integral component coupled to power supply 260.

Memory 240 includes a plurality of storage locations that are addressable by processor 220 and network interfaces 210 for storing software programs and data structures associated with the embodiments described herein. In some embodiments, device 200 may have limited memory or no memory (e.g., no memory for storage other than for programs/processes operating on the device and associated caches). Memory 240 can be in the form of one or more non-transitory computer readable media including instructions executable by the processor 220 that, when executed by the processor 220, cause the processor 220 to implement aspects of the system 100 and the methods (FIGS. 8A and 8B) outlined herein.

Processor 220 comprises hardware elements or logic adapted to execute the software programs (e.g., instructions) and manipulate data structures 245. An operating system 242, portions of which are typically resident in memory 240 and executed by the processor, functionally organizes device 200 by, inter alia, invoking operations in support of software processes and/or services executing on the device. These software processes and/or services may include voltage scaling processes/services 292, which can include aspects of methods and/or implementations of various modules described herein. Note that while voltage scaling processes/services 292 is illustrated in centralized memory 240, alternative embodiments provide for the process to be operated within the network interfaces 210, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the voltage scaling processes/services 292 is shown as a standalone process, those skilled in the art will appreciate that this process may be executed as a routine or module within other processes, including vision application 294 shown in FIG. 8C.

9. Methods

Figure 19A:
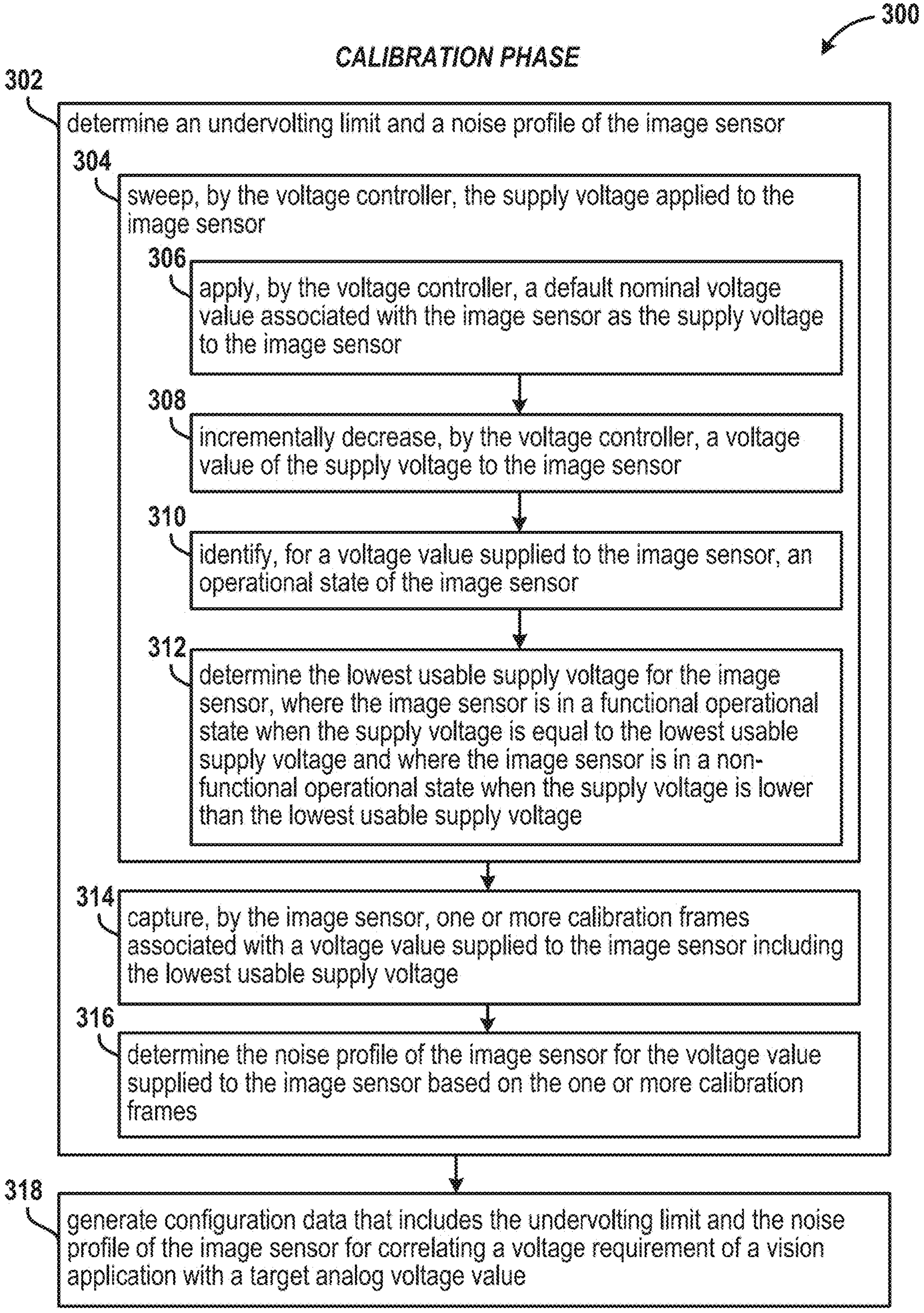
FIGS. 19A and 19B are a pair of process flow diagrams respectively showing a calibration phase and an execution phase of the methods outlined with respect to FIGS. 8A-8C.
Figure 19B:
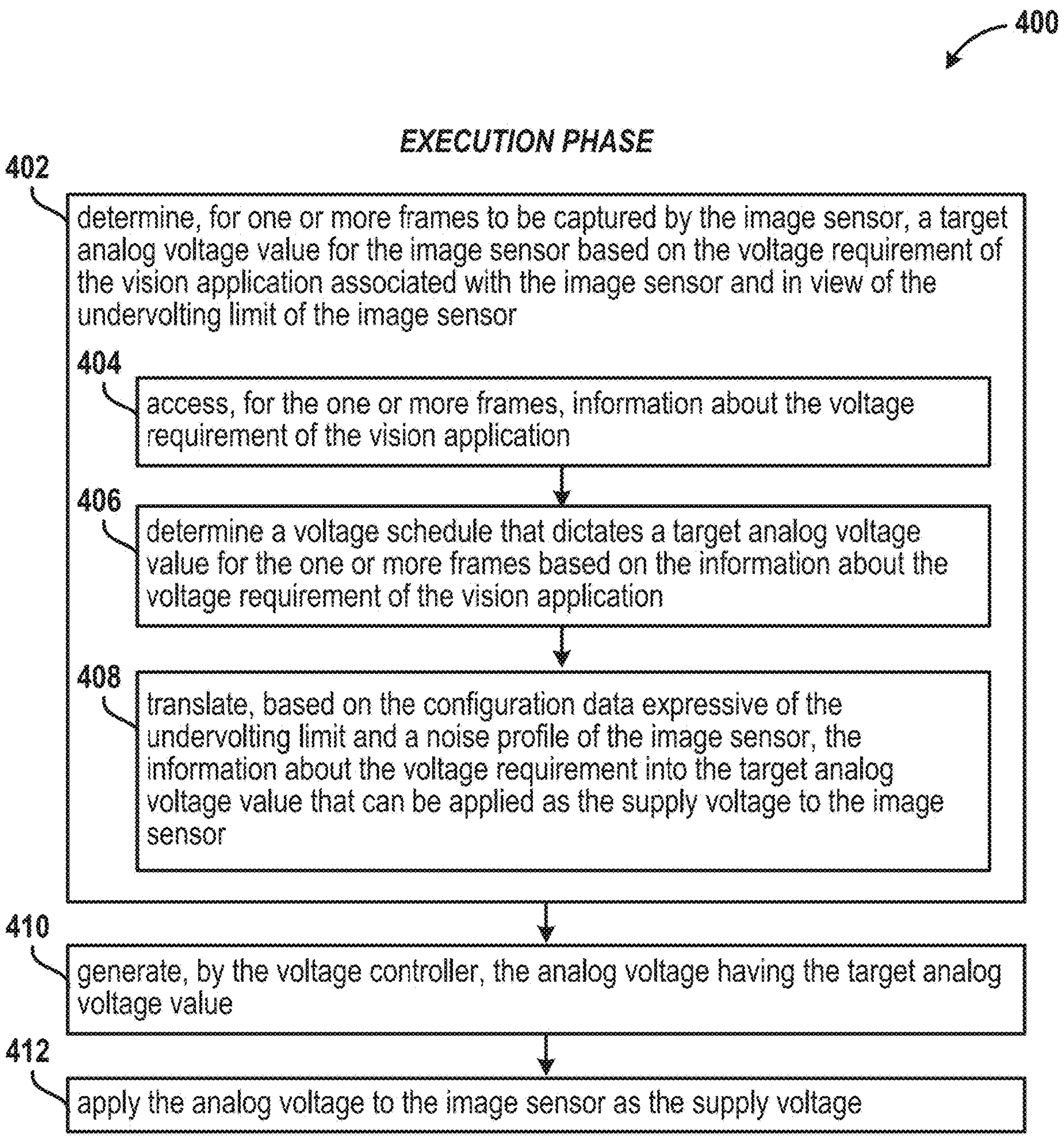

A method for implementation by the system is outlined in this section, and continues the above discussion with respect to FIGS. 8A-8C. The system includes a voltage controller in communication with an image sensor, the voltage controller being configured to apply a supply voltage to the image sensor. The system can further include instructions within a memory in communication with one or more processors and the voltage controller, the instructions being executable by the one or more processors to perform aspects of the method discussed in this section. The method can include a calibration phase (process 300 shown in FIG. 19A) and an execution phase (process 400 shown in FIG. 19B) which can embody aspects of voltage scaling processes/services 292.

The calibration phase (process 300 of FIG. 19A) of the method can include: determining an undervolting limit and a noise profile of the image sensor (step 302 with sub-steps 304-316); and generating configuration data (e.g., a "configuration file" discussed herein) that includes the undervolting limit and the noise profile of the image sensor for correlating a voltage requirement of a vision application with a target analog voltage value of an analog voltage, where the analog voltage is to be applied as a supply voltage to the image sensor (step 318).

The step of determining the undervolting limit can include sweeping, by the voltage controller, the supply voltage applied to the image sensor, where the undervolting limit correlates with a lowest usable supply voltage (sub-step 304). This step can have various sub-steps 306-312, including: applying, by the voltage controller, a default nominal voltage value associated with the image sensor as the supply voltage to the image sensor (sub-step 306); incrementally decreasing, by the voltage controller, a voltage value of the supply voltage to the image sensor (sub-step 308); identifying, for a voltage value supplied to the image sensor, an operational state of the image sensor (sub-step 310); and determining the lowest usable supply voltage for the image sensor, where the image sensor is in a functional operational state when the supply voltage is equal to the lowest usable supply voltage and where the image sensor is in a non-functional operational state when the supply voltage is lower than the lowest usable supply voltage (sub-step 312).

Further, the step of determining the noise profile of the image sensor can include: capturing, by the image sensor, one or more calibration frames associated with a voltage value supplied to the image sensor including the lowest usable supply voltage (sub-step 314); and determining the noise profile of the image sensor for the voltage value supplied to the image sensor based on the one or more calibration frames (sub-step 316).

The execution phase (process 400 of FIG. 19B) can include: determining, for one or more frames to be captured by the image sensor, a target analog voltage value for the image sensor based on the voltage requirement of the vision application associated with the image sensor and in view of the undervolting limit of the image sensor (step 402); generating, by the voltage controller, the analog voltage having the target analog voltage value (step 410); and applying the analog voltage to the image sensor as the supply voltage (step 412).

The step of determining the analog voltage value for the image sensor can include: accessing, for the one or more frames, information about the voltage requirement of the vision application (sub-step 404); translating, based on the configuration data expressive of the undervolting limit and a noise profile of the image sensor, the information about the voltage requirement into the target analog voltage value that can be applied as the supply voltage to the image sensor (sub-step 406); and determining a voltage schedule that dictates a target analog voltage value for the one or more frames based on the information about the voltage requirement of the vision application (sub-step 408). In some examples, the information about the voltage requirement of the vision application can be accessed through an application programming interface.

The functions performed in the processes and methods may be implemented in differing order. Furthermore, the outlined steps and operations are provided as examples, and some of the steps and operations may be optional, combined into fewer steps and operations, or expanded into additional steps and operations without detracting from the essence of the disclosed embodiments.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:

a voltage controller in communication with an image sensor, the voltage controller being configured to apply a supply voltage to the image sensor; and a memory in communication with one or more processors and the voltage controller, the memory including instructions executable by the one or more processors to:

determine, for one or more frames to be captured by the image sensor, a target analog voltage value for the image sensor based on a voltage requirement of a vision application associated with the image sensor and in view of an undervolting limit of the image sensor;

generate, by the voltage controller, an analog voltage having the target analog voltage value; and apply the analog voltage to the image sensor as the supply voltage.

2. The system of claim 1, the memory further including instructions executable by the one or more processors to:

determine the undervolting limit of the image sensor; and generate configuration data that includes the undervolting limit of the image sensor for correlating the voltage requirement of the vision application with the target analog voltage value.

3. The system of claim 2, the memory further including instructions executable by the one or more processors to:

sweep, by the voltage controller, the supply voltage applied to the image sensor, where the undervolting limit correlates with a lowest usable supply voltage.

4. The system of claim 3, the memory further including instructions executable by the one or more processors to:

apply, by the voltage controller, a default nominal voltage value associated with the image sensor as the supply voltage to the image sensor;

incrementally decrease, by the voltage controller, a voltage value of the supply voltage to the image sensor;

identify, for a voltage value supplied to the image sensor, an operational state of the image sensor; and determine the lowest usable supply voltage for the image sensor, where the image sensor is in a functional operational state when the supply voltage is equal to the lowest usable supply voltage and where the image sensor is in a non-functional operational state when the supply voltage is lower than the lowest usable supply voltage.

5. The system of claim 1, the memory further including instructions executable by the one or more processors to:

capture, by the image sensor, one or more calibration frames associated with a voltage value supplied to the image sensor including a lowest usable supply voltage; and determine a noise profile of the image sensor for the voltage value supplied to the image sensor based on the one or more calibration frames.

6. The system of claim 1, the memory further including instructions executable by the one or more processors to:

access, for the one or more frames, information about the voltage requirement of the vision application; and translate, based on configuration data expressive of the undervolting limit and a noise profile of the image sensor, the information about the voltage requirement into the target analog voltage value that can be applied as the supply voltage to the image sensor.

7. The system of claim 6, the memory further including instructions executable by the one or more processors to:

determine a voltage schedule that dictates the target analog voltage value for the one or more frames based on the information about the voltage requirement of the vision application.

8. The system of claim 6, the memory further including instructions executable by the one or more processors to:

access, through an application programming interface, information about the voltage requirement of the vision application.

9. The system of claim 1, the voltage controller including:

a digital-to-analog converter in communication with the one or more processors and operable for accessing, for the one or more frames, the target analog voltage value and generating the analog voltage having the target analog voltage value; and a buffer in communication with the digital-to-analog converter that generates a sufficient current value for supply to the image sensor, where a corresponding output voltage of the buffer is the analog voltage having the target analog voltage value.

10. The system of claim 1, the one or more processors including a server processor in communication with an edge device processor, the edge device processor and the image sensor being components of an image processing pipeline.

11. The system of claim 10, the server processor and the voltage controller being operable for interfacing with the edge device processor and the image sensor of the image processing pipeline.

12. A method, comprising:

determining, at a processor and for one or more frames to be captured by an image sensor in communication with the processor, a target analog voltage value for the image sensor based on a voltage requirement of a vision application associated with the image sensor and in view of an undervolting limit of the image sensor;

generating, by a voltage controller in communication with the image sensor and the processor, an analog voltage having the target analog voltage value; and applying the analog voltage to the image sensor as a supply voltage.

13. The method of claim 12, further comprising:

determining the undervolting limit of the image sensor; and generating configuration data that includes the undervolting limit of the image sensor for correlating the voltage requirement of the vision application with the target analog voltage value.

14. The method of claim 13, further comprising:

sweeping, by the voltage controller, the supply voltage applied to the image sensor, where the undervolting limit correlates with a lowest usable supply voltage.

15. The method of claim 14, further comprising:

applying, by the voltage controller, a default nominal voltage value associated with the image sensor as the supply voltage to the image sensor;

incrementally decreasing, by the voltage controller, a voltage value of the supply voltage to the image sensor;

identifying, for a voltage value supplied to the image sensor, an operational state of the image sensor; and determining the lowest usable supply voltage for the image sensor, where the image sensor is in a functional operational state when the supply voltage is equal to the lowest usable supply voltage and where the image sensor is in a non-functional operational state when the supply voltage is lower than the lowest usable supply voltage.

16. The method of claim 12, further comprising:

capturing, by the image sensor, one or more calibration frames associated with a voltage value supplied to the image sensor including a lowest usable supply voltage; and determining a noise profile of the image sensor for the voltage value supplied to the image sensor based on the one or more calibration frames.

17. The method of claim 12, further comprising:

accessing, for the one or more frames, information about the voltage requirement of the vision application; and translating, based on configuration data expressive of the undervolting limit and a noise profile of the image sensor, the information about the voltage requirement into the target analog voltage value that can be applied as the supply voltage to the image sensor.

18. The method of claim 17, further comprising:

determining a voltage schedule that dictates the target analog voltage value for the one or more frames based on the information about the voltage requirement of the vision application.

19. The method of claim 17, further comprising:

accessing, through an application programming interface, information about the voltage requirement of the vision application.

20. One or more non-transitory computer readable media including instructions executable by one or more processors to:

determine an undervolting limit of an image sensor;

determine, for one or more frames to be captured by the image sensor, a target analog voltage value for the image sensor based on a voltage requirement of a vision application associated with the image sensor and in view of an undervolting limit of the image sensor;

generate, by a voltage controller in communication with the image sensor, an analog voltage having the target analog voltage value; and apply the analog voltage to the image sensor as a supply voltage.

* * * * *